(12) United States Patent
Sethi et al.

(10) Patent No.: US 12,335,315 B2
(45) Date of Patent: Jun. 17, 2025

(54) METHOD AND SYSTEM FOR SMART RECOMMENDATION AND DYNAMIC GROUPING OF DEVICES FOR A BETTER DEVICE MANAGEMENT

(71) Applicant: Dell Products L.P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 216 days.

(21) Appl. No.: 18/349,279

(22) Filed: Jul. 10, 2023

(65) Prior Publication Data
US 2025/0023918 A1   Jan. 16, 2025

(51) Int. Cl.
*H04L 9/40* (2022.01)
*H04L 43/20* (2022.01)

(52) U.S. Cl.
CPC .......... *H04L 63/20* (2013.01); *H04L 63/1408* (2013.01); *H04L 43/20* (2022.05)

(58) Field of Classification Search
None
See application file for complete search history.

(56) References Cited

U.S. PATENT DOCUMENTS

| | | | |
|---|---|---|---|
| 2017/0214708 A1* | 7/2017 | Gukal | G06F 16/285 |
| 2019/0098028 A1* | 3/2019 | Ektare | H04W 4/08 |
| 2021/0344483 A1* | 11/2021 | Zeigler | H04L 9/14 |

\* cited by examiner

*Primary Examiner* — Anh Nguyen
(74) *Attorney, Agent, or Firm* — Chamberlain, Hrdlicka, White, Williams & Aughtry; Aly Z. Dossa

(57) ABSTRACT

A method for managing edge devices includes: monitoring network traffic between an edge device (ED), an edge node (EN), and a cloud device (CD) to obtain a first dataset; monitoring an activity performed on the ED to obtain a second dataset; analyzing the first dataset to generate a network traffic analysis output (NTAO); analyzing the second dataset to generate an activities analysis output (AAO); performing a first tagging of the ED under as either a secured devices category or an unsecured devices category based on the NTAO, AAO, and a first identifier; performing a second tagging of the ED under a corresponding unsecured devices sub-category; upon tagging the ED and based on the AAO, making a determination that the activity is a malicious activity; and implementing a security policy to disrupt a user of the ED.

20 Claims, 10 Drawing Sheets

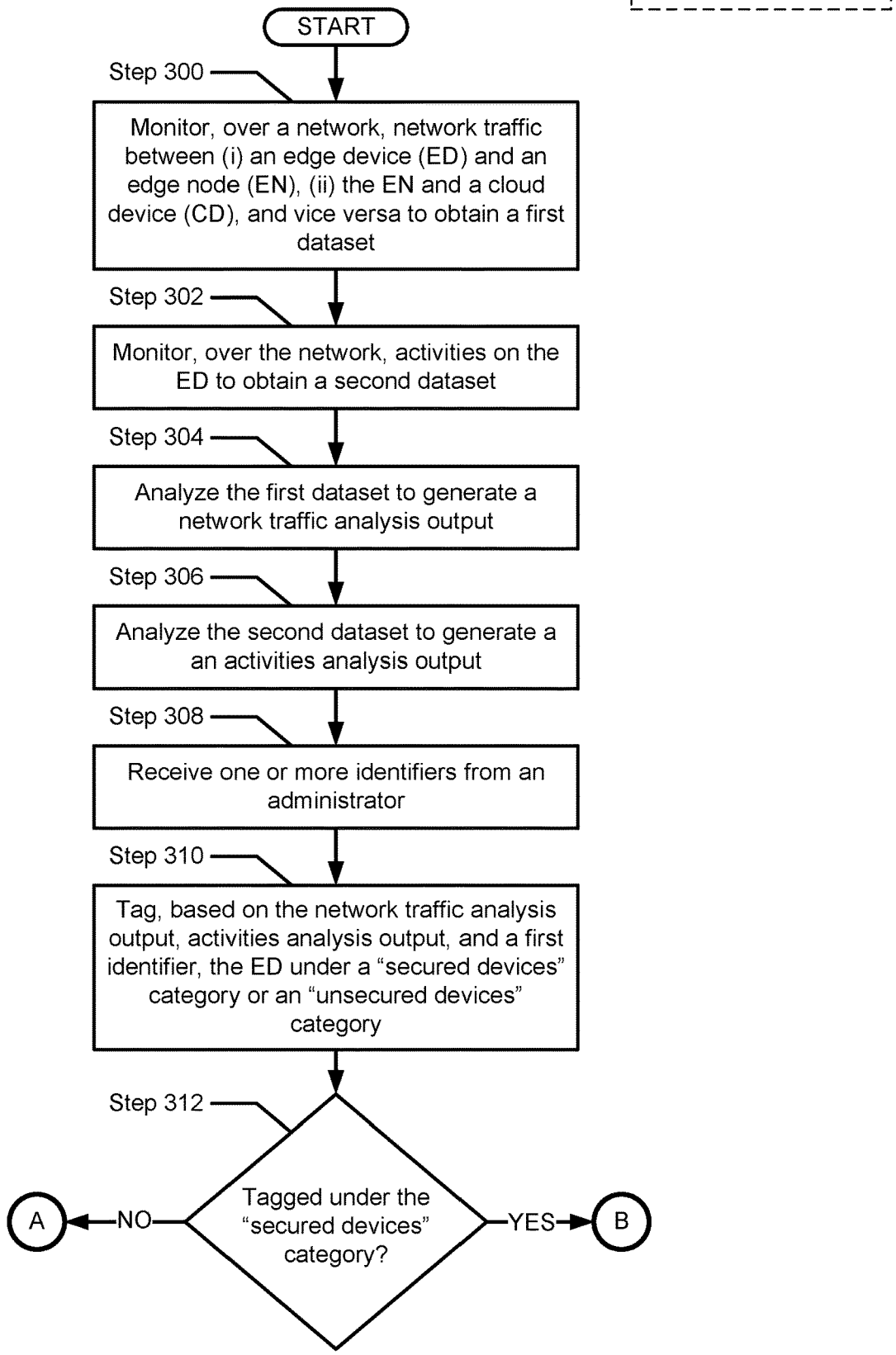
FIG. 3.1

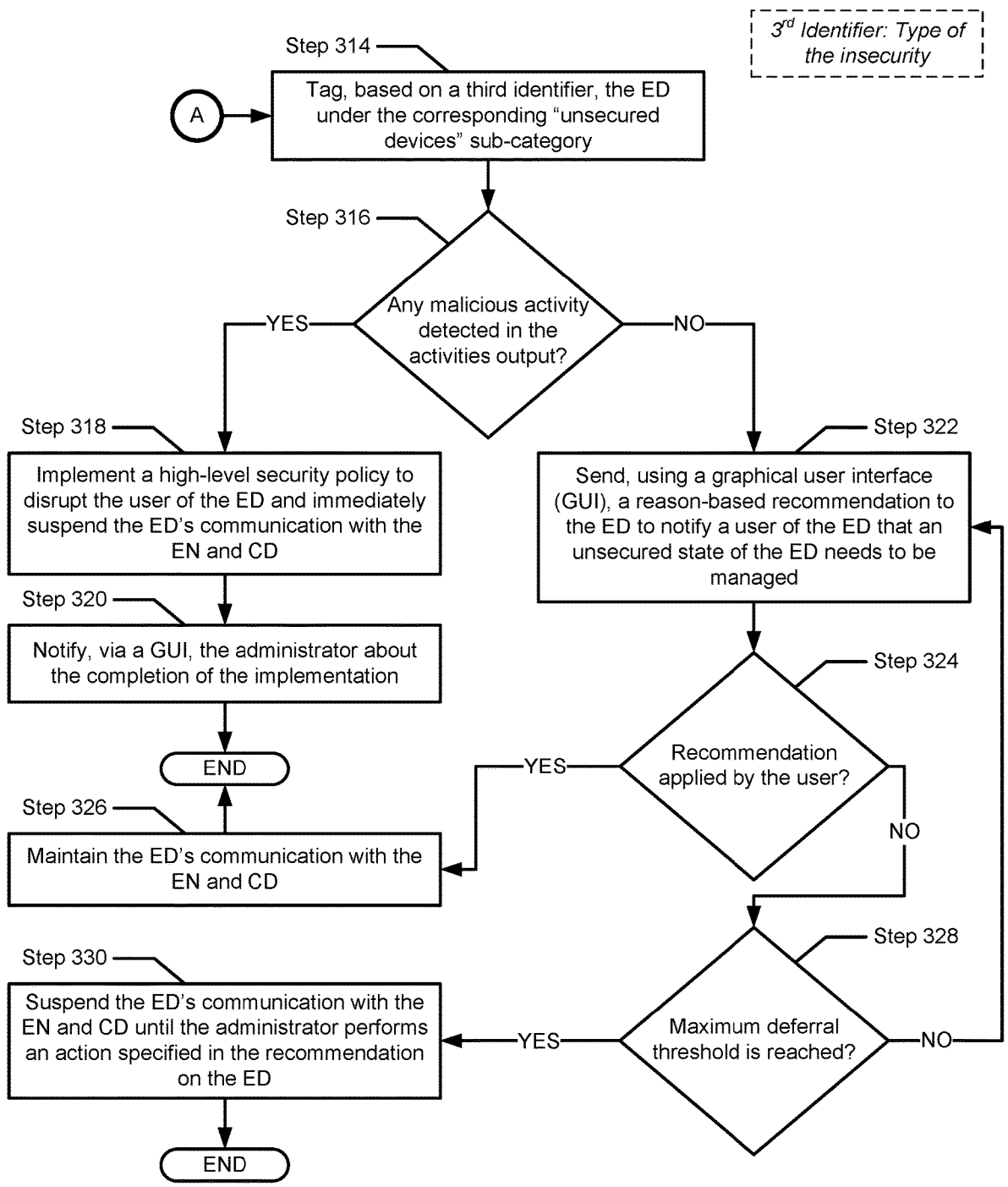
FIG. 3.2

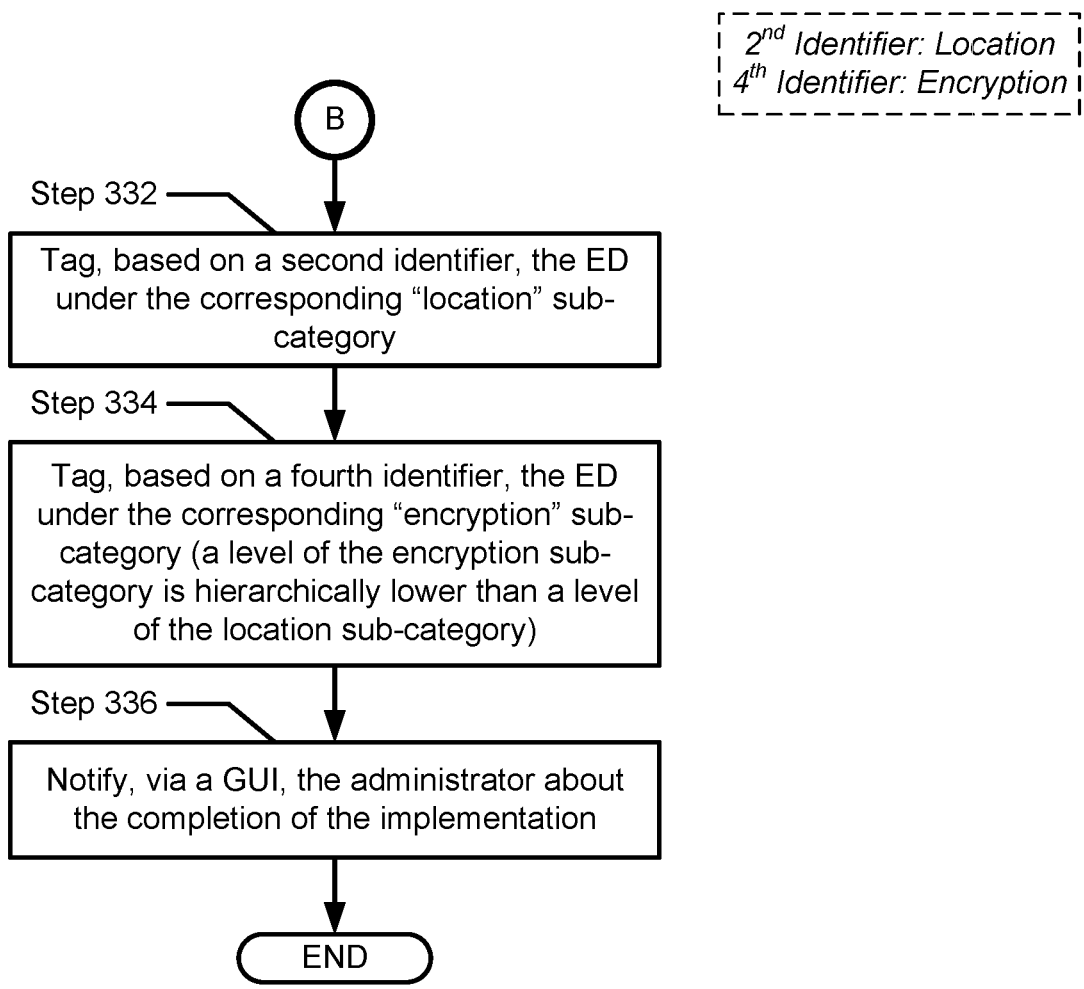
FIG. 3.3

| SOURCE | TARGET | TO/FROM | LOCATION OF SOURCE | LOCATION OF TARGET | DATA CATEGORY OF SOURCE | DATA CATEGORY OF TARGET | SECURITY OF SOURCE | SECURITY OF TARGET |
|---|---|---|---|---|---|---|---|---|
| ED A | EN 1 | To | User Data Center | Data Center | PII data is transferred | N/A | Unsecured due to default password | Secured without default password |
| ED B | EN 2 | Both | User Premises | User Premises | PII data is not transferred | N/A | Not secured | Not secured |
| ED C | CD 1 | From | User Premises | Data Center | N/A | PII data is not transferred | Secured without default password | Secured without default password |

A "network traffic analysis output"

FIG. 4.1

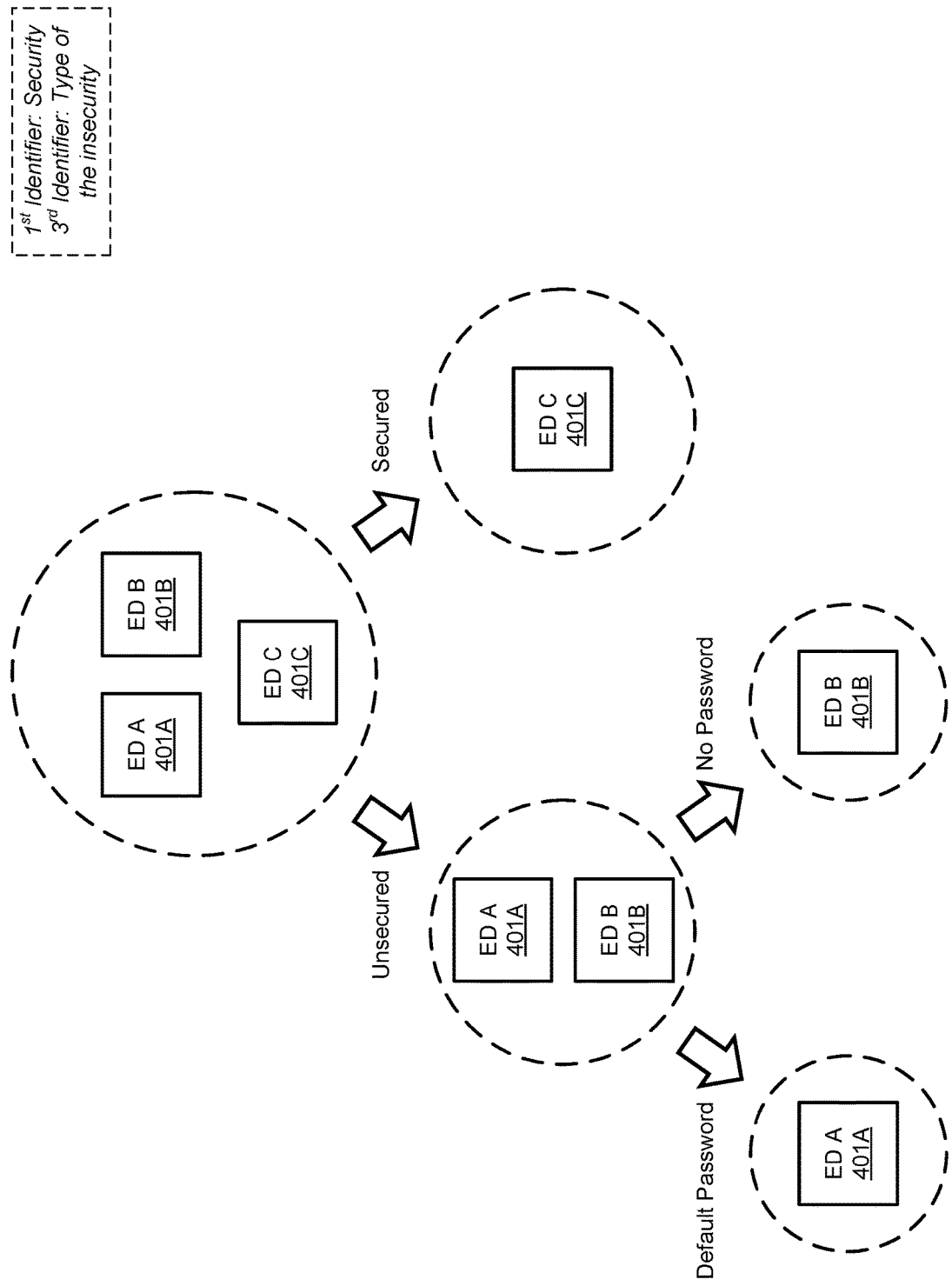
FIG. 4.2

| SOURCE | TARGET | TO/FROM | LOCATION OF SOURCE | LOCATION OF TARGET | DATA CATEGORY OF SOURCE | DATA CATEGORY OF TARGET | SECURITY OF SOURCE | SECURITY OF TARGET |
|---|---|---|---|---|---|---|---|---|
| ED A | EN 1 | To | User Data Center | Data Center | PII data is transferred | N/A | Secured without default password | Secured without default password |
| ED B | EN 2 | Both | User Premises | User Premises in a Different Location | PII data is not transferred | N/A | Secured without default password | Secured without default password |
| ED C | CD 1 | From | User Premises | Data Center in a Different Location | N/A | PII data is not transferred | Secured without default password | Secured without default password |

A "network traffic analysis output"

FIG. 5.1

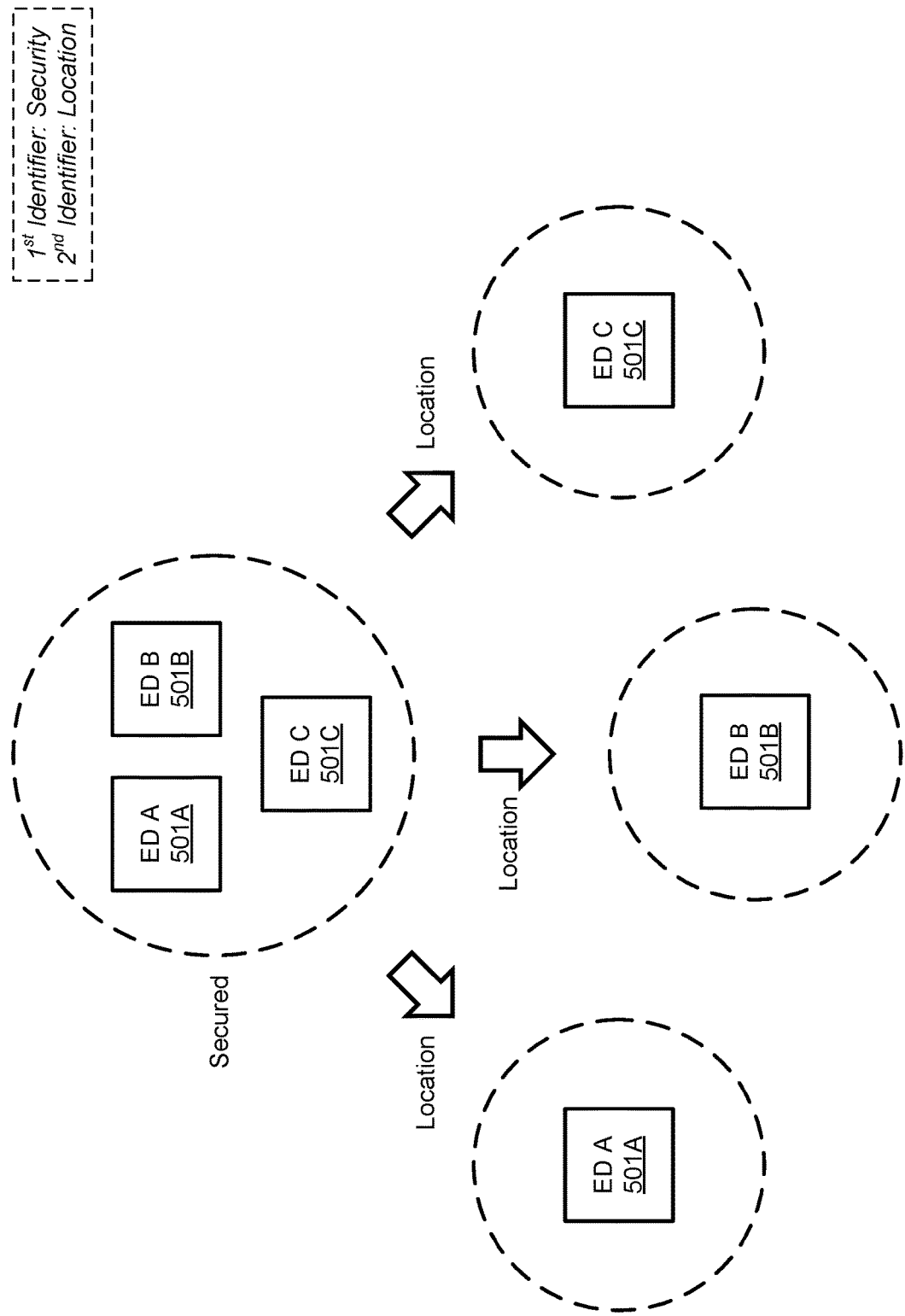
FIG. 5.2

METHOD AND SYSTEM FOR SMART RECOMMENDATION AND DYNAMIC GROUPING OF DEVICES FOR A BETTER DEVICE MANAGEMENT

BACKGROUND

With the development of computer technologies, Internet of Things (IoT) systems have been involved in more and more fields. For example, in an IoT system such as a factory monitoring system, IoT devices may be deployed at various locations in production lines of the factory to collect various device parameters and/or image data. As yet another example, in an IoT system such as a traffic management system, IoT devices may be deployed at various locations in outdoor environments to collect traffic status data at various locations. With the operation of the IoT systems, more and more data may be collected.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for smart recommendation and dynamic grouping of devices in accordance with one or more embodiments of the invention.

FIGS. 4.1 and 4.2 show an example use case in accordance with one or more embodiments of the invention.

FIGS. 5.1 and 5.2 show an example use case in accordance with one or more embodiments of the invention.

DETAILED DESCRIPTION

Figure 1:
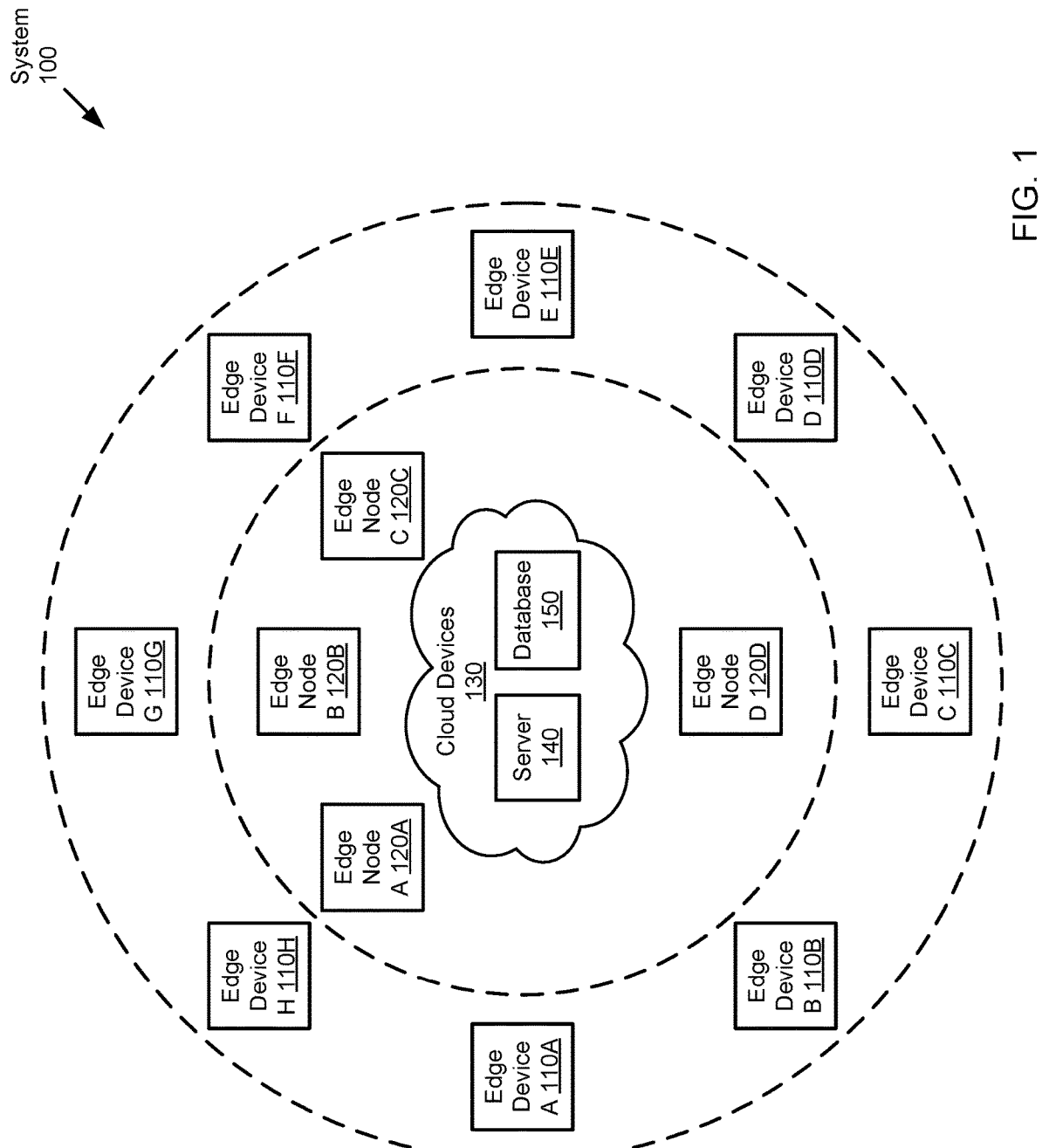
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, IoT networks (or IoT systems) operate from a few to thousands of devices (e.g., computing devices, appliances, vehicles, industrial components, etc.). These scaled systems may need to transmit a massive amount of raw data (e.g., digital information) for communication and data exchange. As expected, IoT traffic may increase latency, crowd bandwidth, and compromise security when vectored unprocessed data to a cloud server (e.g., a central server) or from a central database to a device network (e.g., a network that includes at least two edge devices or IoT devices). For example, edge devices (e.g., smartphones, tablets, wearables, etc.) may or may not have reliable and secure connectivity, and any data flows directly (e.g., without any pre-processing) from the edge devices to a cloud server may bring down (e.g., compromise) the entire IoT network.

In most cases, edge computing (e.g., provided by edge nodes) generates a processing perimeter at the corresponding IoT network edge where logic and analysis may be performed in real-time (e.g., on the order of milliseconds or less) before data is exchanged with core systems (e.g., cloud servers, cloud databases, etc.). Edge computing may (i) reduce traffic sent to and from the corresponding edge devices, (ii) reduce data exchange times in mission critical applications (e.g., for a successful operation, data exchange may need to be Edge Device A→Edge Node B→Cloud Server X; data exchange may need to be Edge Device A→Edge Node B (where Edge Node B itself does the processing and provides a response back to Edge Device A, and at a later point-in-time (based on predetermined secondary rules), Edge Node B may sync the processed data and provided response to Cloud Server X)), such as condition-based monitoring, and (iii) through authorization/authentication mechanism(s) of edge nodes, increase the security of a local network (e.g., where edge devices and edge nodes communicate to each other, for example, Edge Device D may communicate to Edge Device T over Edge Node Y). However, edge computing may still have security vulnerabilities, mostly related to remote access and management issues, and because edge devices increase in popularity and organizations are adopting zero trust policies/models (described below) to improve security and reliability of IoT systems, it has now become even more critical for organizations to pay attention to security-related issues.

For example, a security issue (e.g., a data breach) with one of the devices (e.g., an edge device, an edge node, etc.) may bring down the entire IoT network (including both vulnerable devices and non-vulnerable devices), in which, usually, it is difficult to understand the link between the devices (e.g., Edge Device A→Edge Node B→Cloud Server X) and to secure the linked devices. At least at present, there is no such smart recommendation or automatic/dynamic grouping/ linking of the devices available (i) to isolate and group issue-related devices (or probable issue-related devices) without a manual/human intervention (e.g., by a user through a terminal), (ii) to automatically secure just a link of issue-related devices (or a link of probable issue-related devices), (iii) to manage a specific group of devices and perform upgrade operations, and (iv) to interpret and understand a device failure journey (e.g., a device state chain (e.g., the collation and correlation of the past, present, and future device state paths that led to a failure)) of a device to help other devices that experience the same issue. Said another way, there is no learning (e.g., a trained machine learning (ML) model) on a device failure journey available that may be applied to other devices and identify the security issue proactively.

For example, in Edge Device R, a malicious user has elevated some user privileges, which means the next step would be injecting of a malicious script (e.g., cross-site scripting (XSS)). The moment that this step is being done on Edge Device R, the next step would be initiating a malicious attack towards Edge Device R. However, because this learning process is not available, as soon as such operation is being done on Edge Device R, the corresponding entity would not detect and stop an initiated malicious attack (or suspend Edge Device R's communication to other devices in the IoT network).

For at least the reasons discussed above, a fundamentally different approach is needed. Embodiments of the invention relate to methods and systems for smart recommendation and dynamic grouping of devices for a better device management. More specifically, the embodiments of the invention may first monitor network traffic between an edge device, an edge node, and a cloud device to obtain a first dataset. An activity performed on the edge device may also be monitored to obtain a second dataset. The first dataset may be analyzed to generate a network traffic analysis output. The second dataset may then be analyzed to generate an activities analysis output.

Thereafter, based on the network traffic analysis output, activities analysis output, and a first identifier, the edge device may be tagged under a secured devices category or an unsecured devices category, in which a first determination may indicate that the edge device is tagged under the unsecured devices category. Based on the first determination and a second identifier, the edge device may be further tagged under a corresponding unsecured devices sub-category. Upon tagging the edge device under the corresponding unsecured devices sub-category and based on the activities analysis output, a second determination may indicate that the activity performed on the edge device is a malicious activity. Finally, based on the second determination, a high-level security policy may be implemented to disrupt a malicious user of the edge device that performed the malicious activity.

As a result of the processes discussed below, one or more embodiments disclosed herein advantageously ensure that: (i) administrators not need to invest most of their time and engineering efforts to understand and categorize devices operating on an IoT system, (ii) without the requirement of resource-intensive efforts, useful and detailed insights are extracted from the devices' failure journeys, network traffic, and other related dependencies (e.g., application logs, system logs, triggered alerts, etc.), (iii) based on the extracted insights and specific identifiers (e.g., identifiers to perform zero trust upgrades), issue-related devices (or probable issue-related devices) are automatically isolated and grouped (e.g., to generate a link of issue-related devices) so that restrictions can be applied on the issue-related devices, (iv) based on the extracted insights, for example, a link of issue-related devices is automatically secured (e.g., by proactively providing smart recommendations (for that link) to the corresponding administrators/users based on the security issue) so that reliable and secure connectivity between devices operating on an IoT system can re-established (e.g., without suffering from remote access and management issues), (v) based on the extracted insights, a device failure journey is interpreted (a) to manage potentially problematic future states of the corresponding device for a better product management and development, and (b) to proactively help other devices that experience the same issue, (vi) based on the extracted insights, administrators identify a user profile of a user more in-depth in order to provide a better user experience to the user, (vii) based on the extracted insights, identify a device profile (e.g., a device state) of a device (e.g., an edge device, an edge node, etc.), and (viii) based on the extracted insights, administrators invest most of their time and engineering efforts to efficiently enhance resilience of the corresponding IoT system.

The following describes various embodiments of the invention.

FIG. 1 shows a diagram of a system (100) in accordance with one or more embodiments of the invention. The system (100) includes any number of IoT devices or edge devices (e.g., Edge Device A (110A), Edge Device B (110B), etc.), any number of edge nodes (e.g., Edge Node A (120A), Edge Node B (120B), etc.), any number of servers (e.g., 140), any number of databases (e.g., 150), and a network (not shown). The system (100) may facilitate the management of data from any number of sources (e.g., 110A, 120A, 140, etc.). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the edge devices (e.g., 110A, 110B, etc.), the edge nodes (e.g., 120A, 120B, etc.), the server (140), the database (150), and the network may be physical or logical devices, as discussed below. In one or more embodiments, the server (140) and the database (150) may collectively be referred to as "cloud devices (130)".

While FIG. 1 shows a specific configuration of the system (100), other configurations may be used without departing from the scope of the invention. For example, although the edge devices (e.g., 110A, 110B, etc.) are shown as a first layer of the system (100), the edge nodes (e.g., 120A, 120B, etc.) are shown as a second layer of the system (100), and the cloud devices (130) are shown as a third layer of the system (100), the system (100) may include another layer (e.g., a fog layer) in between the second layer and third layer. In one or more embodiments, the fog layer may include one or more "fog" devices, similar to that of edge nodes (e.g., 120A, 120B, etc.), in which both the edge nodes (e.g., 120A, 120B, etc.) and fog devices perform distributed computing and focus on the physical deployment of compute and storage resources in relation to data that is being produced (e.g., the difference is a matter of where those resources are located such as edge computing refers to computational processes being done at or near the "edge" of an IoT network/environment (e.g., 100), whereas fog computing refers to the network connections between the edge nodes (e.g., 120A, 120B, etc.) and the cloud devices (130) to extend the cloud devices (130) closer to the edge of the IoT network).

In some cases, the cloud devices (130) may be too far away (e.g., a centralized and geographically distant cloud device (e.g., 140, 150, etc.) may increase the frequency of communication between the edge devices (e.g., 110A, 110B, etc.) and the cloud device) and the edge nodes (e.g., 120A, 120B, etc.) may be resource-limited (or physically distributed) to provide practical, real-time edge computing. To this end, "fog computing" (or "cloudlet computing") may help such as, for example, (i) fog computing may generate massive amounts of sensor or IoT data across expansive physical areas (e.g., smart cities, smart utility grids, etc.) that are just too large to perform edge computing (e.g., collect, process, and analyze data), (ii) if a user does not want every sensor data get stored in the database (150), the corresponding edge node (e.g., 120A, 120B, etc.), via the fog computing, may partially share the sensor data with the database (150) (e.g., 50% of the sensor data is available in Edge Node A and the remaining 50% of the sensor data is available in Fog Node F, where both Edge Node A and the server (140) may access that portion of data from Fog Node F).

Further, functioning of the edge nodes (e.g., 120A, 120B, etc.) and the cloud devices (130) is not dependent upon the functioning and/or existence of the other components (e.g., devices) in the system (100). Rather, the edge nodes (e.g., 120A, 120B, etc.) and the cloud devices (130) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job.

As used herein, the term "data" is intended to be broad in scope. In this manner, that term embraces, for example (but not limited to): data segments that are produced by data stream (e.g., from the edge devices (e.g., 110A, 110B, etc.)) segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the system (100) may be a distributed system and may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of clients (e.g., the edge devices (e.g., 110A, 110B, etc.)). The system (100) may also represent a comprehensive middleware layer executing on computing devices (e.g., 600, FIG. 6) that supports virtualized application environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide the aforementioned computer-implemented services to the users, the system (100) may perform some computations (e.g., data collection, distributed processing of collected data, etc.) locally (e.g., at the users' site using the edge devices (e.g., 110A, 110B, etc.)) and other computations remotely (e.g., away from the users' site using the edge nodes (e.g., 120A, 120B, etc.)) from the users. By doing so, the users may utilize different computing devices (e.g., 600, FIG. 6) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc.

As used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, an edge device (e.g., 110A, 110B, etc.) may include functionality to, e.g.: (i) capture sensory input (e.g., sensor data) in the form of text, audio, video, touch or motion, (ii) collect massive amounts of data at the edge of the IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the edge nodes (e.g., 120A, 120B, etc.)), store, or otherwise utilize captured sensor data (and/or any other type and/or quantity of data), and (iv) provide surveillance services (e.g., determining object-level information) for scenes (e.g., a physical region of space). One of ordinary skill will appreciate that the edge device (e.g., 110A, 110B, etc.) may perform other functionalities without departing from the scope of the invention.

In one or more embodiments, the edge devices (e.g., 110A, 110B, etc.) may be geographically distributed clients (e.g., user devices, front-end devices, etc.) and may have relatively restricted hardware and/or software resources when compared to the server (140) (described below). In one or more embodiments, as being a sensing device, each of the edge devices (e.g., 110A, 110B, etc.) may be adapted to provide monitoring services. For example, an edge device (e.g., 110A, 110B, etc.) may monitor the state of a scene (e.g., objects disposed in a scene). The monitoring may be performed by obtaining sensor data from sensors that are adapted to obtain information regarding the scene. An edge device (e.g., 110A, 110B, etc.) may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, etc.

In one or more embodiments, sensor data may be implemented as, for example, a list. Each entry of the list may include information representative of, for example, (i) periods of time and/or points-in-time associated with when a portion of sensor data included in the entry was obtained and/or (ii) the portion of sensor data. The sensor data may have different organizational structures without departing from the scope of the invention. For example, the sensor data may be implemented as a tree, a table, a linked list, etc.

In one or more embodiments, the edge devices (e.g., 110A, 110B, etc.) may be physical or logical computing devices configured for hosting one or more workloads, or for providing a computing environment whereon workloads may be implemented. The edge devices (e.g., 110A, 110B, etc.) may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the edge devices (e.g., 110A, 110B, etc.)). The edge devices (e.g., 110A, 110B, etc.) may correspond to computing devices that one or more users use to interact with one or more components of the system (100).

In one or more embodiments, an edge device (e.g., 110A, 110B, etc.) may include any number of applications (and/or content accessible through the applications) that provide computer-implemented application services to a user. Applications may be designed and configured to perform one or more functions instantiated by a user of the edge device (e.g., 110A, 110B, etc.). Examples of an application may include (but not limited to): a word processor, a media player, a web browser, a file viewer, an image editor, etc.

In order to provide application services, each application may host similar or different components. The components may be, for example (but not limited to): instances of databases, instances of email servers, etc. Applications may be executed on one or more edge devices (e.g., 110A, 110B, etc.) as instances of the application.

In one or more embodiments, applications may vary in different embodiments, but in certain embodiments, applications may be custom developed or commercial (e.g., off-the-shelf) applications that a user desires to execute in an edge device (e.g., 110A, 110B, etc.). In one or more embodiments, applications may be logical entities executed using computing resources of an edge device (e.g., 110A, 110B, etc.). For example, applications may be implemented as computer instructions (e.g., computer code) stored on persistent storage of the edge device (e.g., 110A, 110B, etc.) that when executed by the processor(s) of the edge device cause the edge device to provide the functionality of the applications described throughout the application.

In one or more embodiments, while performing, for example, one or more operations requested by a user, applications installed on an edge device (e.g., 110A, 110B, etc.) may include functionality to request and use physical and logical resources of the edge device. Applications may also include functionality to use data stored in storage/memory resources of the edge device (e.g., 110A, 110B, etc.). The applications may perform other types of functionalities not listed above without departing from the scope of the invention. In one or more embodiments, while providing application services to a user, applications may store data that may be relevant to the user in storage/memory resources of an edge device (e.g., 110A, 110B, etc.).

In one or more embodiments, to provide services to the users, the edge devices (e.g., 110A, 110B, etc.) may utilize, rely on, or otherwise cooperate with the edge nodes (e.g., 120A, 120B, etc.). For example, the edge devices (e.g., 110A, 110B, etc.) may issue requests to the edge nodes (e.g., 120A, 120B, etc.) to receive responses and interact with various components of the edge nodes (e.g., 120A, 120B, etc.). The edge devices (e.g., 110A, 110B, etc.) may also request data from and/or send data to the edge nodes (e.g., 120A, 120B, etc.) (for example, the edge devices (e.g., 110A, 110B, etc.) may transmit information to the edge nodes (e.g., 120A, 120B, etc.) that allows the edge nodes (e.g., 120A, 120B, etc.) to perform computations, the results of which are used by the edge devices (e.g., 110A, 110B, etc.) to provide services to the users). As yet another example, the edge devices (e.g., 110A, 110B, etc.) may utilize application services provided by the edge nodes (e.g., 120A, 120B, etc.). When the edge devices (e.g., 110A, 110B, etc.) interact with the edge nodes (e.g., 120A, 120B, etc.), data that is relevant to the edge devices (e.g., 110A, 110B, etc.) may be stored (temporarily or permanently) in the edge nodes (e.g., 120A, 120B, etc.).

As yet another example, consider a scenario in which an edge node (e.g., 120A, 120B, etc.) hosts a database (different from the database (150)) utilized by the edge devices (e.g., 110A, 110B, etc.). In this scenario, the database may be a client database associated with users of the edge devices (e.g., 110A, 110B, etc.). When a new user is identified, the edge devices (e.g., 110A, 110B, etc.) may add information of the new user to the client database. By doing so, data that is relevant to the edge devices (e.g., 110A, 110B, etc.) may be stored in the edge node (e.g., 120A, 120B, etc.). This may be done because the edge devices (e.g., 110A, 110B, etc.) may desire access to the information of the new user at some point-in-time.

As yet another example, an edge device (e.g., 110A, 110B, etc.) may execute an application that interacts with an application database hosted by an edge node (e.g., 120A, 120B, etc.). When an application upgrade is available to fix a critical software issue, the edge node (e.g., 120A, 120B, etc.) may identify the edge device (e.g., 110A, 110B, etc.) that requires the application upgrade. The application database may then provide the application upgrade to the edge device (e.g., 110A, 110B, etc.). By doing so, the application executed by the edge device (e.g., 110A, 110B, etc.) may be kept up-to-date. As yet another example, an edge device (e.g., 110A, 110B, etc.) may send instructions to an edge node (e.g., 120A, 120B, etc.) to configure one or more VMs hosted by the edge node (e.g., 120A, 120B, etc.). In one or more embodiments, instructions may be, for example (but not limited to): instructions to configure a backup policy, instructions to take a snapshot of VM data, etc. As yet another example, an edge device (e.g., 110A, 110B, etc.) may initiate an application to execute on an edge node (e.g., 120A, 120B, etc.) such that the application may (itself) gather, transmit, and/or otherwise manipulate data located in the edge node (e.g., 120A, 120B, etc.).

In this manner, an edge device (e.g., 110A, 110B, etc.) may be capable of, e.g.: (i) collecting users' inputs, (ii) correlating collected users' inputs to the computer-implemented services to be provided to the users, (iii) communicating with one or more edge nodes (e.g., 120A, 120B, etc.) that perform computations necessary to provide the computer-implemented services, (iv) using the computations performed by the edge nodes (e.g., 120A, 120B, etc.) to provide the computer-implemented services in a manner that appears (to the users) to be performed locally to the users, and (v) communicating with any virtual desktop (VD) in a virtual desktop infrastructure (VDI) environment (or a virtualized architecture) provided by the edge nodes (e.g., 120A, 120B, etc.) (using any known protocol in the art), for example, to exchange remote desktop traffic or any other regular protocol traffic (so that, once authenticated, users may remotely access independent VDs (which may accommodate customized settings) via the corresponding client(s)).

As described above, the edge devices (e.g., 110A, 110B, etc.) may provide computer-implemented services to users (and/or other computing devices). The edge devices (e.g., 110A, 110B, etc.) may provide any number and any type of computer-implemented services (e.g., data storage services, electronic communication services, etc.). To provide computer-implemented services, each edge device may include a collection of physical components (e.g., processing resources, storage/memory resources, networking resources, etc.) configured to perform operations of the edge device and/or otherwise execute a collection of logical components (e.g., virtualization resources) of the edge device.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, an edge device (e.g., 110A, 110B, etc.) may include a memory management unit (MMU) (not shown), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the edge devices (e.g., 110A, 110B, etc.) provide computer-implemented services to users, the edge devices (e.g., 110A, 110B, etc.) may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the edge devices (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface an edge device with external entities (e.g., the edge nodes (e.g., 120A, 120B, etc.)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the edge device and the external entities. For example, a networking resource may enable the edge device to be operatively connected, via Ethernet, using a TCP protocol to form a "network fabric", and may enable the communication of data between the edge device and the external entities. In one or more embodiments, each edge device may be given a unique identifier (e.g., an Internet Protocol (IP) address) to be used when utilizing the above-mentioned protocols.

Further, a networking resource, when using a certain protocol or a variant thereof, may support streamlined access to storage/memory media of other edge devices (e.g., 110A, 110B, etc.). For example, when utilizing remote direct memory access (RDMA) to access data on another edge device, it may not be necessary to interact with the logical components of that edge device. Rather, when using RDMA, it may be possible for the networking resource to interact with the physical components of that edge device to retrieve and/or transmit data, thereby avoiding any higher-level processing by the logical components executing on that edge device.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

As an example, a VM may be executed using computing resources of an edge device (e.g., 110A, 110B, etc.). The VM (and applications hosted by the VM) may generate data (e.g., VM data) that is stored in the storage/memory resources of the edge device (e.g., 110A, 110B, etc.), in which the VM data may reflect a state of the VM. In one or more embodiments, the VM may provide services to users, and may host instances of databases, email servers, or other applications that are accessible to the users.

In one or more embodiments, a virtualization resource may include a hypervisor (e.g., a VM monitor), in which the hypervisor may be configured to orchestrate an operation of, for example, a VM by allocating computing resources of an edge device (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor.

Alternatively, in one or more of embodiments, the hypervisor may be implemented as computer instructions (e.g., computer code) stored on storage/memory resources of the edge device (e.g., 110A, 110B, etc.) that when executed by processing resources of the edge device cause the edge device to provide the functionality of the hypervisor.

In one or more embodiments, an edge device (e.g., 110A, 110B, etc.) may be, for example (but not limited to): a smartphone, a tablet, a wearable, a gadget, a closed-circuit television (CCTV) camera, a music player, a game controller, etc.

Figure 6:
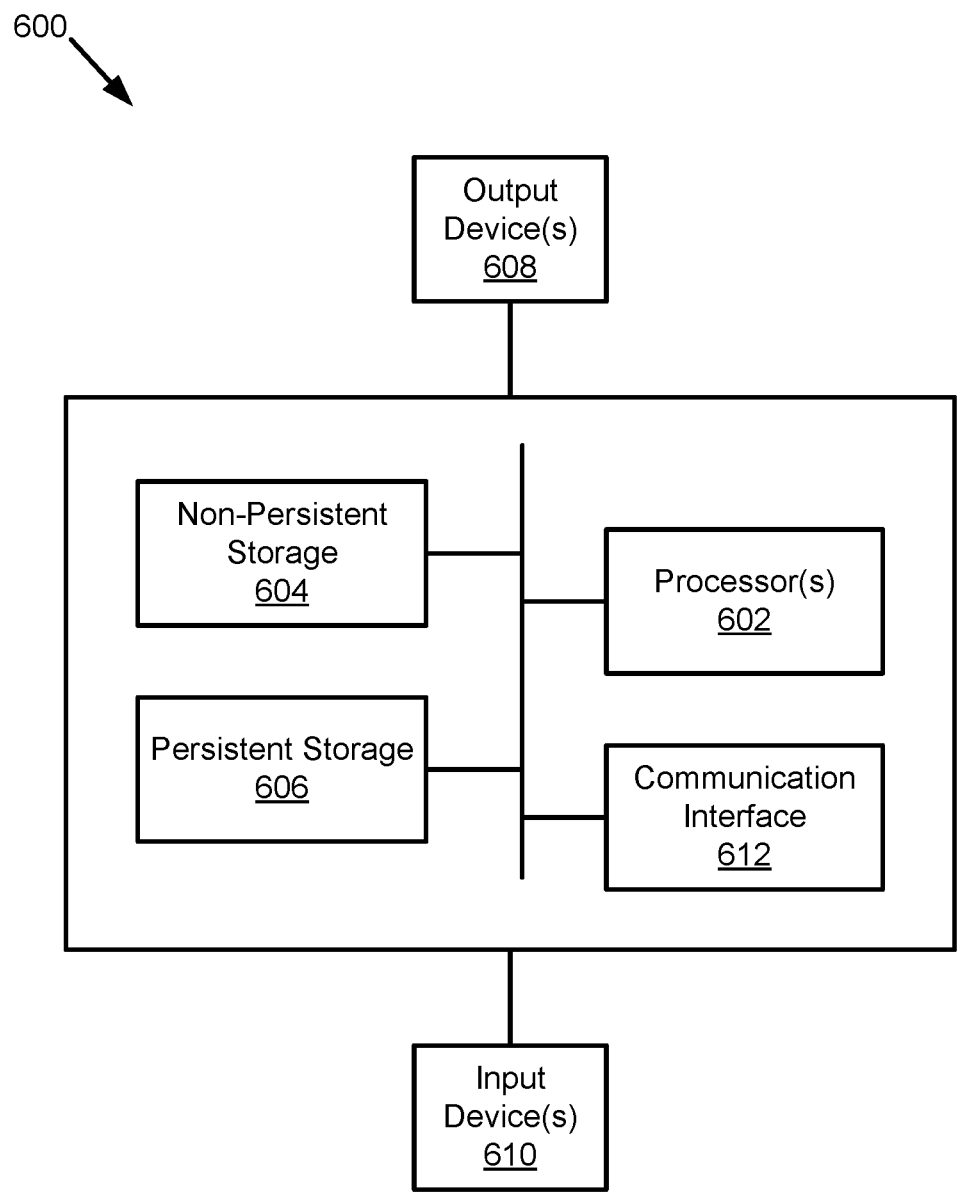
FIG. 6 shows a diagram of a computing device in accordance with one or more embodiments of the invention.

Further, in one or more embodiments, an edge device (e.g., 110A, 110B, etc.) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge device (e.g., 110A, 110B, etc.) described throughout the application.

Alternatively, in one or more embodiments, the edge device (e.g., 110A, 110B, etc.) may be implemented as a logical device (e.g., a VM). The logical device may utilize the computing resources of any number of computing devices to provide the functionality of the edge device (e.g., 110A, 110B, etc.) described throughout this application.

In one or more embodiments, users may interact with (or operate) the edge devices (e.g., 110A, 110B, etc.) in order to perform work-related tasks (e.g., production workloads). In one or more embodiments, the accessibility of users to the edge devices (e.g., 110A, 110B, etc.) may depend on a regulation set by an administrator of the edge devices (e.g., 110A, 110B, etc.). To this end, each user may have a personalized user account that may, for example, grant access to certain data, applications, and computing resources of the edge devices (e.g., 110A, 110B, etc.). This may be realized by implementing the "virtualization" technology. In one or more embodiments, an administrator may be a user with permission (e.g., a user that has root-level access) to make changes on the edge devices (e.g., 110A, 110B, etc.) that will affect other users of the edge devices (e.g., 110A, 110B, etc.).

In one or more embodiments, for example, a user may be automatically directed to a login screen of an edge device when the user connected to that edge device. Once the login screen of the edge device is displayed, the user may enter credentials (e.g., username, password, etc.) of the user on the login screen. The login screen may be a graphical user interface (GUI) generated by a visualization module (not shown) of the edge device. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, through the concept of edge computing, some of the computational load may be moved towards to the edge of the IoT network to harness computational capabilities (of the edge nodes (e.g., 120A, 120B, etc.)) that may be untapped in edge nodes, which are located closer (for example, one-hop away from an edge device (e.g., 110A, 110B, etc.)) to users to reduce possible network latency (for example, for mission critical and/or latency-sensitive applications).

In one or more embodiments, an edge node (e.g., 120A, 120B, etc.) may include functionality to, e.g.: (i) obtain (or receive) data (e.g., any type and/or quantity of sensory input) from any source (e.g., the edge devices (e.g., 110A, 110B, etc.)) (and, if necessary, aggregate the data), (ii) perform complex analytics and analyze data that is received from one or more edge devices (e.g., 110A, 110B, etc.) to generate additional data that is derived from the obtained data without experiencing any middleware and hardware limitations, (iii) provide meaningful information (e.g., a response) back to the corresponding edge devices (e.g., 110A, 110B, etc.), (iv) filter data (e.g., received from an edge device (e.g., 110A, 110B, etc.)) before pushing the data (and/or the derived data) to one or more cloud devices (130) for management of the data and/or for storage of the data (while pushing the data, the edge node may include information regarding a source of the data (e.g., a device/domain/unique identifier/etc.) so that such information may be used to associate provided data with one or more of the users (or data owners)), (v) provide sensible power management strategies to prevent overloading of the cloud devices (130) with trivial tasks (e.g., by performing those tasks without significant energy implications), (vi) reduce the response time of the edge devices (e.g., 110A, 110B, etc.) by minimizing the volume of network traffic to the cloud devices (130) or by distributing traffic in the network, (vii) incorporate strategies (e.g., strategies to provide virtual desktop infrastructure capabilities) for remotely enhancing capabilities of the edge devices (e.g., 110A, 110B, etc.), (viii) provide robust security features to the edge devices (e.g., 110A, 110B, etc.) and make sure that a minimum level of service is always provided to a user of an edge device, (ix) only transmit the result(s) of the computing work performed (e.g., real-time business insights, equipment maintenance predictions, other actionable responses, etc.) to the cloud devices (130) for review and/or other human interactions, (x) reduce latency and the amount of on-cloud computations, (xi) reduce networking costs, especially for wireless cellular connections, (xii) when outlier data appears in data obtained from an edge device (e.g., 110A, 110B, etc.), perform an action to provide a real-time response to local events occurred in the edge device (due to its proximity, where no round-trip is needed from the edge device to the server (140)), (xiii) monitor the operational states of the edge devices (e.g., 110A, 110B, etc.) (described below), (xiv) in order to ensure that data obtained from the edge devices (e.g., 110A, 110B, etc.) are completely recorded, back up the obtained data to the database (150), (xv) regularly back up configuration information of the edge devices (e.g., 110A, 110B, etc.) to the database (150), (xvi) in response to a power failure (or a potential power failure), communicate with a second edge node in the system (100) and obtain any zone/location information of the edge node to determine whether the second edge node is available to process data obtained from one or more edge devices (e.g., 110A, 110B, etc.), (xvii) provide (e.g., via a broadcast, multicast, or unicast mechanism) information (e.g., a geographical location, a location identifier, the amount of available resources, etc.) associated with the edge node to other edge nodes in the system (100), (xviii) configure or control any mechanism that defines when, how, and what data the other edge nodes provide to the cloud devices (130) and/or fog devices, (xix) enable the edge devices (e.g., 110A, 110B, etc.) to communicate with other computing devices in the system (100), and (xx) manage operations of one or more edge devices (e.g., receiving information from the edge devices (e.g., 110A, 110B, etc.) regarding changes in the operation of the edge devices) to improve their operations (e.g., improve the quality of data being generated, decrease the computing resources cost of generating data, etc.).

In one or more embodiments, once data is (and/or will be) provided by an edge device (e.g., 110A, 110B, etc.) to an edge node (e.g., 120A, 120B, etc.), users may desire access to the data managed by the edge node (e.g., 120A, 120B, etc.) (in conjunction with the cloud devices (130)). To facilitate provisioning of access to the aforementioned data, the edge node (e.g., 120A, 120B, etc.) may manage one or more data structures, such as block chains, that include information regarding data ownership, information regarding data that is managed by the edge node (e.g., 120A, 120B, etc.), information regarding the users (e.g., data owners), and/or information regarding how the users may access the stored data.

In one or more embodiments, by providing data management services and/or operational management services (in conjunction with the cloud devices (130)) to the users and/or other entities, the edge node (e.g., 120A, 120B, etc.) may enable any number of entities to access data. As part of providing the data management services, the edge node (e.g., 120A, 120B, etc.) may provide a secure method for storing and accessing data. Additionally, the method of securely storing and accessing data may facilitate providing access to the data to any number of entities. By doing so, access to data in the system (100) may be provided securely while facilitating provisioning of access to the data.

The data management services and/or operational management services provided by the edge node (e.g., 120A, 120B, etc.) may include, e.g.: (i) obtaining data from one or more edge devices (e.g., 110A, 110B, etc.), (ii) aggregating the obtained data (e.g., storing copies of the data and/or organizing the data, storing metadata regarding the data, etc.), (iii) generating derived data based on the obtained data (by employing a set of linear, non-linear, and/or machine learning (ML) models), (iv) providing the obtained data, derived data, and/or metadata associated with the data and/or derived data to the cloud devices (130) (and/or other entities), (v) managing updates to a deployment in which an data aggregator (e.g., 140) resides, and (vi) managing when, how, and/or what data the edge devices (e.g., 110A, 110B, etc.) provide to the edge node (e.g., 120A, 120B, etc.).

In one or more embodiments, in order to provide the above-mentioned functionalities, an edge node (e.g., 120A, 120B, etc.) may need to communicate with other components of the system (100) with minimum amount of latency (e.g., with high-throughput (e.g., a high data transfer rate) and sub-millisecond latency). For this reason, representational state transfer application programming interfaces (REST APIs) may be used to enable communication(s) between the edge node (e.g., 120A, 120B, etc.) and the other components.

In one or more embodiments, to be able to communicate with the cloud devices (130) (e.g., an IoT hub), an edge node (e.g., 120A, 120B, etc.) and/or an edge device (e.g., 110A, 110B, etc.) may register to the IoT hub. For example, to be able to register/connect to the IoT hub, the edge node (e.g., 120A, 120B, etc.) may make an API call to the IoT hub. In one or more embodiments, based on receiving an API call from the edge node (e.g., 120A, 120B, etc.), the IoT hub may send a connection string (e.g., that has a predetermined length) to the edge node (e.g., 120A, 120B, etc.). The edge node (e.g., 120A, 120B, etc.) may then use the connection string to connect to the IoT hub.

In one or more embodiments, the connection string may be a data structure that includes one or more parameters (e.g., location information of the server (140), authentication information for the server (140), etc.) required for an entity to connect to the IoT hub (or any component). In one or more embodiments, the corresponding component of the IoT hub may be offline for, for example, a system maintenance to configure and upgrade an operating system (OS). While the corresponding component is offline, the connection between the edge node (e.g., 120A, 120B, etc.) and the corresponding component may be disconnected. When the corresponding component comes back online, the edge node (e.g., 120A, 120B, etc.) may reconnect to the corresponding component using the same connection string.

In one or more embodiments, an edge node (e.g., 120A, 120B, etc.) may be, for example (but not limited to): a router, a switch, a network device with routing or switching functionality, a small/macro base station, a small enclosure (with several servers and some storage) installed atop of a wind turbine to collect and process data produced by sensors within the turbine (e.g., an edge device) itself (where the result(s) of such processing may then be transmitted to the server (140) for a human review), etc.

Further, edge computing may provide one or more advantageous with respect to, for example (but not limited to): computation standards to complement the computations performed on the cloud devices (130), benchmarking and marketplace, frameworks and languages, lightweight libraries and models, micro OSs and virtualization, decentralized cloud and low latency computing, surmounting resource limitations of the edge devices (e.g., 110A, 110B, etc.), sustainable energy consumption, capability to deal with data explosion and network traffic, making real-time decisions on numerous data streams that are generated by the edge devices (e.g., 110A, 110B, etc.) (for example, a latency-sensitive visual guiding service (provided by a wearable camera) may have a preferred response between 25 ms to 50 ms), data processing at the periphery of the periphery of the IoT network (as close to the originating source as possible, rather than transmitting raw data to the cloud devices (130) for processing and analysis), distinguish different types of raw data obtained from the edge devices (e.g., 110A, 110B, etc.) and identify what level of response is required for each type of data, etc.

In one or more embodiments, the edge nodes (e.g., 120A, 120B, etc.) may be geographically distributed so that computing may be performed closer to the source of data (e.g., edge devices (e.g., 110A, 110B, etc.) where data is generated) to improve the service that is delivered to a user of an edge device (e.g., 110A, 110B, etc.). In one or more embodiments, an edge node (e.g., 120A, 120B, etc.) (via its collector (e.g., 210, FIG. 2)) may monitor the operational states of the edge devices (e.g., 110A, 110B, etc.). The operational state of an edge device (e.g., 110A, 110B, etc.) may correspond to the ability of the edge device to perform predetermined functionalities (e.g., obtaining information regarding a scene associated with an edge device). For example, the monitoring of the operational states of the edge devices (e.g., 110A, 110B, etc.) may be used to determine whether it is likely that the monitoring of the scenes by the edge devices results in information regarding the scenes that accurately reflects the states of the scenes (e.g., a damaged edge device may provide inaccurate information regarding a monitored scene). Said another way, by providing monitoring services, an edge node (e.g., 120A, 120B, etc.) may be able to determine whether an edge device (e.g., 110A, 110B, etc.) is malfunctioning (e.g., the operational state of an edge device may change due to a damage to the edge device, malicious action (e.g., hacking, a physical attack, etc.) by third-parties, etc.).

As yet another example, to monitor the edge devices (e.g., 110A, 110B, etc.), an edge node (e.g., 120A, 120B, etc.) may, while the edge devices are in a predetermined state, obtain a scene signature of a scene monitored by an edge device. The scene signature may be used to determine, at future points-in-time, whether the edge device (e.g., 110A, 110B, etc.) is in a predetermined operational state that results in the generation of accurate information regarding a monitored scene. If the edge device (e.g., 110A, 110B, etc.) is not in the predetermined operational state (e.g., if the edge device is malfunctioning), the edge node (e.g., 120A, 120B, etc.) may take action to remediate the edge device. Remediating the edge device (e.g., 110A, 110B, etc.) may result in the edge device being placed in the predetermined operational state which improves the likelihood that monitoring of the scene by the edge device results in the generation of accurate information regarding the scene.

One of ordinary skill will appreciate that an edge node (e.g., 120A, 120B, etc.) may perform other functionalities without departing from the scope of the invention. In one or more embodiments, the edge node (e.g., 120A, 120B, etc.) may be configured to perform all, or a portion, of the functionalities described in FIGS. 3.1-3.3. Additional details about the edge node are described below in reference to FIG. 2.

In one or more embodiments, an edge node (e.g., 120A, 120B, etc.) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge node (e.g., 120A, 120B, etc.) described throughout the application.

Alternatively, in one or more embodiments, similar to an edge device (e.g., 110A, 110B, etc.), the edge node (e.g., 120A, 120B, etc.) may also be implemented as a logical device.

As described above, the server (140) and the database (150) may be one of the cloud devices (130). In one or more embodiments, the cloud devices (130) may represent components of a logical computing environment (e.g., a cloud computing environment) that may be owned and/or operated by a third-party, for example, by a third-party providing cloud services. As used herein, a "cloud" refers to servers (e.g., 140) that are accessed over the Internet (and the software and databases that executes on those servers). With the help of cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

Cloud computing is possible because of a technology called "virtualization". Virtualization allows for the generation of a VM that behaves as if it was a physical computing device with its own hardware components. When properly implemented, VMs on the same host are sandboxed from one another so that they do not interact with each other, and the files and/or applications from one VM are not visible to another VM even though they are on the same physical computing device.

In one or more embodiments, cloud computing environments (which may or may not be public) may include storage environments that may provide data protection functionality for one or more users. Cloud computing environments may also perform computer-implemented services (e.g., data protection, data processing, etc.) on behalf of one or more users. In one or more embodiments, cloud computing environments (which may or may not be public) may include storage environments (e.g., 150) that may provide data protection functionality for one or more users. Cloud computing environments may also perform computer-implemented services (e.g., data protection, data processing, etc.) on behalf of one or more users. Some example cloud computing environments that embodiments of the invention may be employed include (but not limited to): Microsoft® Azure, Amazon® AWS, Dell® Cloud Storage Services, Google® Cloud, etc.

In one or more embodiments, as being implemented as a logical computing device, the server (140) (e.g., a site, a node, etc.) may include functionality to, e.g.: (i) provide/orchestrate software-defined data protection (e.g., centralized data protection; self-service data protection; automated data discovery, protection, management, and recovery; etc.), (ii) provide automated data discovery, protection, management, and recovery operations in on-premises, (iii) provide data deduplication, (iv) empower data owners (e.g., users) to perform self-service data backup and restore operations from their native applications, (v) ensure compliance and satisfy different types of service level objectives (SLOs), (vi) simplify VM image backups of a VM with near-zero impact on the VM, (vii) in conjunction with the edge nodes (e.g., 120A, 120B, etc.), increase resiliency of the system (100) by enabling rapid recovery or cloud disaster recovery from cyber incidents. (viii) provide operational simplicity, agility, and flexibility for physical, virtual, and cloud-native information technology (IT) environments, (ix) host one or more components (e.g., computing devices) and maintain various workloads for providing a computing environment whereon workloads may be implemented (to provide computer-implemented services), (x) support an infrastructure that is based on a network of computing and storage resources that enable the delivery of shared applications and data (e.g., the server (140) may exchange sensor data with other components of the system (100) registered in/to a network in order to, for example, participate in a collaborative workload placement; the server (140) may split up a request (e.g., an operation, a task, an activity, etc.) with another server, coordinating its efforts to complete the request (e.g., to generate a response) more efficiently than if the server (140) had been responsible for completing the request; etc.), (xi) consolidate multiple data process or protection requests (received from, for example, the edge nodes (e.g., 120A, 120B, etc.)) so that duplicative operations (which may not be useful for restoration purposes) are not generated, (xii) initiate multiple data process or protection operations in parallel (e.g., an engine (of the server (140)) may host multiple operations, in which each of the multiple operations may (a) manage the initiation of a respective operation and (b) operate concurrently to initiate multiple operations), (xiii) provide data management and/or operational management services (in conjunction with the edge nodes (e.g., 120A, 120B, etc.)) to the users and/or other entities to enable secure data access and secure data storage, (xiv) manage operations of one or more edge nodes (e.g., receiving information from the edge nodes (e.g., 120A, 120B, etc.) regarding changes in the operation of the edge nodes) to improve their operations (e.g., improve the quality of data being generated, decrease the cost of generating data, etc.), (xv) support a highly scalable deployment of compute and storage resources at one or more global locations/regions (where the closest regional cloud devices facility may still be hundreds of miles away from the edge devices (e.g., 110A, 110B, etc.)), and (xvi) obtain data from any number of sources (e.g., the edge devices (e.g., 110A, 110B, etc.), the edge nodes (e.g., 120A, 120B, etc.), etc.) and for management of the data, register the data when stored in the database (150).

In one or more embodiments, the server (140) may be a heterogeneous set, including different types of hardware components, software components, and/or different types of OSs. One of ordinary skill will appreciate that the server (140) may perform other functionalities without departing from the scope of the invention.

In one or more embodiments, the server (140) may be capable of providing a range of functionalities/services to users. However, not all of the users may be allowed to receive all of the services. To manage the services provided to the users, a system (e.g., a service manager) in accordance with embodiments of the invention may manage the operation of a network, in which the edge devices (e.g., 110A, 110B, etc.) and the edge nodes (e.g., 120A, 120B, etc.) are operably connected to the server (140).

Specifically, the service manager (i) may identify services to be provided by the server (140) (for example, based on the number of users using the edge devices (e.g., 110A, 110B, etc.)) and (ii) may limit communications of the edge devices (e.g., 110A, 110B, etc.) to receive server-provided services. For example, the priority (e.g., the user access level) of a user may be used to determine how to manage computing resources within the server (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the network.

Further, consider a scenario where a first user is to be treated as a normal user (e.g., a user with a user access level/tier of 4/10). In such a scenario, the user level of that user may indicate that certain ports (of the subcomponents of the network corresponding to communication protocols such as TCP, UDP, etc.) are to be opened, other ports are to be blocked/disabled so that (i) certain services are to be provided to the user by the server (140) (e.g., while the components of the server (140) may be capable of providing any number of remote computer-implemented services, they may be limited in providing some of the services over the network) and (ii) network traffic from that user is to be afforded a normal level of quality (e.g., a normal processing rate with a limited communication bandwidth (BW)). By doing so, (i) computer-implemented services provided to the users may be granularly configured without modifying the operation(s) of the edge devices (e.g., 110A, 110B, etc.) and (ii) the overhead for managing the services of the edge devices (e.g., 110A, 110B, etc.) may be reduced by not requiring modification of the operation(s) of the edge devices (e.g., 110A, 110B, etc.) directly.

In contrast, a second user may be determined to be a high priority user (e.g., a user with a user access level of 9/10). In such a case, the user level of that user may indicate that more ports are to be opened than were for the first user so that (i) components of the server (140) may provide more services to the second user and (ii) network traffic from that user is to be afforded a high level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), an application executable or code, an application configuration, a hardware resources configuration, a supporting services configuration, a network connectivity configuration, etc.

As used herein, a "policy" is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups in connection with which embodiments of the invention may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, a "file system" is a method that an OS (e.g., Microsoft® Windows, Apple® MacOS, etc.) uses to control how data is named, stored, and retrieved. For example, once a user has logged into a computing device (e.g., 600, FIG. 6), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, the server (140) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the server (140) described throughout this application.

Alternatively, in one or more embodiments, similar to an edge device (e.g., 110A, 110B, etc.), the server (140) may also be implemented as a logical device.

In one or more embodiments, the database (150) may be a fully managed cloud (or local) database (or any logical container) that acts as a shared storage or memory (simply storage/memory) resource that is functional to store unstructured and/or structured data. Further, the database (150) may also occupy a portion of a physical storage/memory device or, alternatively, may span across multiple physical storage/memory devices.

In one or more embodiments, the database (150) may be implemented using physical devices that provide data storage services (e.g., storing data and providing copies of previously stored data). The devices that provide data storage services may include hardware devices and/or logical devices. For example, the database (150) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (150) may include a memory device (e.g., a dual in-line memory device), in which data is stored and from which copies of previously stored data are provided. As yet another example, the database (150) may include a persistent storage device (e.g., an SSD), in which data is stored and from which copies of previously stored data is provided. As yet another example, the database (150) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (150) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (150) may store/log/record (temporarily or permanently) unstructured and/or structured data that may include (or specify), for example (but not limited to): a valid (e.g., a granted) request and its corresponding details, an invalid (e.g., a rejected) request and its corresponding details, one or more details (e.g., content of the intercepted data packets, information regarding the sender (e.g., a malicious user, a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, recently obtained user activity records, a cumulative history of user activity records obtained over a prolonged period of time, a cumulative history of network traffic logs obtained over a prolonged period of time, previously received malicious data access requests from an invalid user, a backup history documentation of a workload, details of data objects that do not match the corresponding configuration parameters (described below) (in this manner, the logged details may be used to audit a user, incoming network traffic, and/or outgoing network traffic), one or more lists that specify which computer-implemented services should be provided to which user (depending on a user access level of a user), one or more policies/rules/settings for the operation (or configuration) of any portion of the server (140) (to manage security, network traffic, network access, or any other function/operation performed by the server (140)), a model name of a hardware component, a version of an application, a product identifier of an application, instructions for obtaining an executable and/or script (e.g., high level instructions that may cause an entity to perform one or more actions), instructions to generate a new instance of a component of the server (140) and cause the new instance to operate on data being and/or will be obtained, data obtained from data providers (e.g., 110A, 110B, etc.), metadata regarding obtained and/or derived data, a ranking of the types of data (e.g., based on higher utilization rates, higher demand, etc.) obtained from data providers, an application log, a system log, a user type (e.g., a knowledge worker, a power worker, a task worker with relatively low-end compute requirements, a high-end user that requires a rich multimedia experience, etc.), an index of an asset (e.g., a file, a folder, etc.), recently obtained customer/user information (e.g., records, credentials, etc.) of a user, a cumulative history of initiated model training operations (e.g., sessions) over a prolonged period of time, a restore history documentation of a workload, a documentation that indicates a set of jobs (e.g., a data backup job, a data restore job, etc.) that has been initiated, a documentation that indicates a status of a job (e.g., how many jobs are still active, how many jobs are completed, etc.), a set of SLAs (e.g., an agreement that indicates a period of time required to retain data available in the database (150)), a cumulative history of initiated data backup operations over a prolonged period of time, a cumulative history of initiated data restore operations over a prolonged period of time, an identifier of a vendor, an identifier of a user/customer, customer data, a setting of an application, a display resolution configuration of an edge device, an amount of storage used by an application, a language setting of an OS, a serial number of a device, a hardware identification number of a hardware component, an identifier of a computing device's manufacturer, a profile of a valid user, a profile of an invalid user, a fraud report for an invalid user, one or more outputs of the processes performed by the server (140), a workload allocation table, a workload priority ranking, a resource health ranking, information regarding the services that are to be provided to users of edge devices (where the information may include, for example, identifiers of the users, priority of the users (to determine how to marshal limited computing resources in the system (100)), device user guides, device release notes, videos and/or community forum questions and answers, a security fix, a version of a security fix, an amount of bare metal communications (e.g., input/output operations executed by an application per second) executed by an application executing on the server (140), power consumption of components of the server (140), etc. Based on the aforementioned data, for example, the server (140) may perform user analytics to infer profiles of users communicating with the edge nodes (e.g., 120A, 120B, etc.) and/or the server (140).

In one or more embodiments, configuration parameters may specify (or include), for example (but not limited to): a request ruleset (described below); a response ruleset (described below); one or more rules/policies that are provided based on (i) a profile of a user, (ii) an identification of an edge device, (iii) a type of a network connection, (iv) a type of an edge device, (v) a type of an edge node, (vi) contents/payloads of network traffic; etc.

In one or more embodiments, during the deployment of the database (150), an administrator of the database (150) may directly provide the configuration parameters (which may be configured directly), or the configuration parameters may be imported by the administrator in the form of, for example, an extensible markup language (XML) file or JavaScript object notation (JSON) file.

In one or more embodiments, a request ruleset (e.g., one or more rules/configurations that allow the collector (e.g., 210, FIG. 2) to act as an inbound/incoming network traffic filter) may specify (or include), for example (but not limited to): a request decryption rule, a request authentication rule (which may be utilized by the collector (e.g., 210, FIG. 2) to validate a request), a rule regarding how the monitoring component (e.g., 205, FIG. 2) should operate, a type of an allowable network communication/protocol between an entity and components of the server (140), a particular header that needs to be included in an intercepted request, a smart contract that defines under what conditions a request should be accepted (e.g., granted), a smart contract that defines under what conditions data (e.g., sensor data) should be transferred to the server (140), one or more rules/policies for detecting and blocking illegitimate requests and application-based attacks, one or more rules/policies to protect components of an edge node (e.g., 120A, 120B, etc.) and/or the server (140) against various classes and types of Internet-based vulnerabilities (e.g., buffer overflow, common gateway interface (CGI)-Bin parameter manipulation, form/hidden filed manipulation, forceful browsing, XSS, command injection, error triggering sensitive information leak, back doors and debug options, platform or OS vulnerabilities, etc.), etc.

In one or more embodiments, a response ruleset (e.g., one or more rules/configurations that allow the collector (e.g., 210, FIG. 2) to act as an outbound network traffic filter) may include (or specify), for example (but not limited to): an attribution rule (e.g., a type/format of an asset (e.g., a ".pdf" file, a ".doc" file, a ".jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc.

Figure 2:
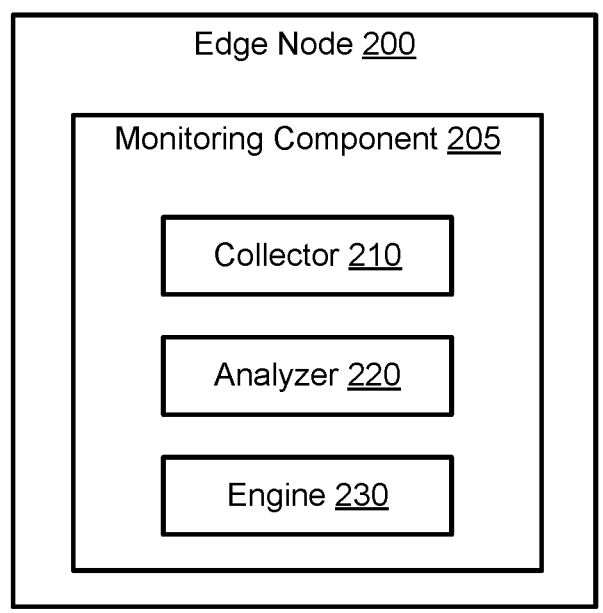
FIG. 2 shows a diagram of an edge node in accordance with one or more embodiments of the invention.

In one or more embodiments, the authentication related rules included in the response ruleset and request ruleset may be the same across all edge nodes of an organization to perform a uniform and successful authentication process. As shown in FIG. 2, the monitoring component (205) is deployed to one of the edge nodes. However, the system (100) may include additional monitoring components (e.g., hooked as adapters) that may be deployed to other components (e.g., one or more edge devices (e.g., 110A, 110B, etc.), other edge nodes, one or more fog devices, the server (140), etc.) of the system (100) to perform all, or a portion, of the methods illustrated in FIGS. 3.1-3.3.

In one or more embodiments, the unstructured and/or structured data may be updated (automatically) by third-party systems (e.g., platforms, marketplaces, etc.) (provided by vendors) or by administrators based on, for example, newer (e.g., updated) versions of SLAs being available. The unstructured and/or structured data may also be updated when, for example (but not limited to): a data backup operation is initiated, a set of jobs is received, a data restore operation is initiated, an ongoing data backup operation is fully completed, etc.

In one or more embodiments, the database (150) may provide an indexing service (e.g., a registration service). That is, data may be indexed or otherwise associated with registration records (e.g., a registration record may be a data structure that includes information (e.g., an identifier associated with data) that enables the recorded data to be accessed). More specifically, an agent of the database (150) may receive various data related inputs directly (or indirectly) from an edge node (e.g., 120A, 120B, etc.) (or indirectly from an edge device (e.g., 110A, 110B, etc.)). Upon receiving, the agent may analyze those inputs to generate an index(es) (e.g., a data backup operation index(es)) for optimizing the performance of the database (150) by reducing a required amount of database access(es) when implementing a request (e.g., a data retrieval request). In this manner, requested data may be quickly located and accessed from the database (150) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

In one or more embodiments, the unstructured and/or structured data may be maintained by, for example, the server (140). The server (140) may add, remove, and/or modify those data in the database (150) to cause the information included in the database (150) to reflect the latest version of, for example, SLAs. The unstructured and/or structured data available in the database (150) may be implemented using, for example, lists, tables, unstructured data, structured data, etc. While described as being stored locally, the unstructured and/or structured data may be stored remotely, and may be distributed across any number of devices without departing from the scope of the invention.

While the database (150) has been illustrated and described as including a limited number and type of data, the database (150) may store additional, less, and/or different data without departing from the scope of the invention. In the embodiments described above, the database (150) is demonstrated as part of the cloud devices (130); however, embodiments herein are not limited as such. In one or more embodiments, the database (150) may be a separate entity from the cloud devices (130).

One of ordinary skill will appreciate that the database (150) may perform other functionalities without departing from the scope of the invention. When providing its functionalities, the database (150) may perform all, or a portion, of the methods illustrated in FIGS. 3.1-3.3. The database (150) may be implemented using hardware, software, or any combination thereof.

In one or more embodiments, each component (e.g., 110A, 120A, 140, 150, etc.) of the system (100) may be a part of a business operation region (BOR) (not shown) of an organization, in which the BOR corresponds to a geographic region (e.g., a city, a county, a state, a province, a country, a country grouping (e.g., the European Union), etc.). For example, Edge Node A (120A) of Organization X may be located in the United States and Edge Node B (120B) of Organization X may be located in the Netherlands, in which Organization X has multiple geographically distributed edge nodes around the world.

In one architecture (e.g., the "unidirectional" architecture), one of the edge nodes (e.g., the parent edge node) of an organization may be deployed to the United States, which serves (e.g., shares) data to/among the remaining edge nodes (e.g., the child edge nodes that are deployed to Argentina, India, and France) of the organization. In this architecture, the child edge nodes may transmit their data to the parent edge node so that the parent edge node is always updated. Thereafter, the parent edge node may distribute/forward received data to the child edge nodes to keep the child edge nodes equally updated.

In another architecture (e.g., the "bidirectional" architecture), one of the edge nodes of an organization may be deployed to Greece and the other one may be deployed to Spain, in which both edge nodes know each other and when a data change is occurred in one of them, the other edge node may automatically obtain that data to stay updated.

Further, in another architecture (e.g., the "multidirectional" architecture), an organization may have multiple edge nodes deployed around the world and all of the edge nodes know each other. When one of the edge nodes is updated (e.g., when that edge node receives a software package), the remaining edge nodes are updated accordingly (e.g., by sending a data transfer request to each of the remaining edge nodes).

In one or more embodiments, all, or a portion, of the components of the system (100) may be operably connected each other and/or other entities via any combination of wired and/or wireless connections. For example, the aforementioned components may be operably connected, at least in part, via a network.

A network may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network and its subcomponents may be implemented using hardware, software, or any combination thereof.

In one or more embodiments, for example, when the server (140) communicates with components of Edge Node C (120C) over the network, the server (140) may transmit data structures (e.g., lists, tables, etc.) having a predetermined format in accordance with a communication protocol implemented by the server (140), network, and/or components of Edge Node C (120C).

In one or more embodiments, before communicating data over the network, the data may first be broken into smaller batches (e.g., data packets) so that larger size data can be communicated efficiently. For this reason, the network-enabled subcomponents may break data into data packets. The network-enabled subcomponents may then route each data packet in the network to distribute network traffic uniformly.

In one or more embodiments, the network-enabled subcomponents may decide how real-time network traffic and non-real-time network traffic should be managed in the network. In one or more embodiments, real-time network traffic may be high priority (e.g., urgent, immediate, etc.) network traffic. For this reason, data packets of the real-time network traffic may need to be prioritized in the network. The real-time network traffic may include data packets related to, for example (but not limited to): videoconferencing, web browsing, voice over Internet Protocol (VOIP), etc.

In one or more embodiments, non-real-time network traffic may be low priority (e.g., non-urgent) network traffic. For this reason, data packets of the non-real-time network traffic may not need to be prioritized in the network. The non-real-time network traffic may include data packets related to, for example (but not limited to): File Transfer Protocol (FTP) for web publishing, email applications, etc.

As used herein, "network traffic" is an amount of data moving across a network at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, in data center administration, network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, the collector (e.g., 210, FIG. 2) may include a firewall. A firewall is a network monitoring/security component that monitors all incoming and outgoing network traffic (e.g., requests, responses, calls, etc.), in which it decides whether to allow or block specific network traffic based on a defined set of security rules (e.g., the request ruleset, the response ruleset, etc.). A firewall may be, for example (but not limited to): a hardware component, a software component, a software as-a-service (SaaS), a private cloud, etc. The aforementioned example is not intended to limit the scope of the invention.

A firewall may monitor network traffic to determine, for example (but not limited to): network availability, unusual activities on a network, etc. In most cases, an unusual activity (e.g., an unusually high amount of network traffic) on a network may be a sign of a security issue (e.g., a malicious attack). Because of the determined unusual activity, the firewall may notify an administrator (e.g., a network service provider (NSP) of the network. Based on receiving the notification from the firewall, the NSP of the network may reconfigure the network to fix the security issue.

Turning now to FIG. 2, FIG. 2 shows a diagram of an edge node (200) in accordance with one or more embodiments of the invention. The edge node (200) may be an example of the edge node discussed above in reference to FIG. 1. The edge node (200) may include a monitoring component (205), which includes a collector (210), an analyzer (220), an engine (206), and a database (not shown). The edge node (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments, the monitoring component (205) may operate in a manner transparent (e.g., a transparent reverse proxy) to any component of the edge node (200), any edge device (e.g., 110A, 110B, etc., FIG. 1), and/or any user communicating with the edge node (200). In one or more embodiments, when any of the components of the monitoring component (205) is down or unavailable to perform its functionalities, a second monitoring component (e.g., deployed to another edge node) may continue to provide functionalities of the unavailable component.

In one or more embodiments, as being a lightweight component/application, the edge node (200) may easily configure and/or manage the monitoring component (205) for high availability and reliability. Further, the monitoring component (205) may provide, for example (but not limited to): global load balancing (e.g., being responsible for distributing incoming network traffic (evenly) across a group of edge nodes to optimize resource usage and to prevent any edge node from becoming overloaded), site failover, network traffic management across an organization's multiple edge nodes and public cloud provider networks, protection from attacks (e.g., with the monitoring component (205) in place, a service never needs to reveal the IP address, which makes harder to perform a distributed denial of service (DDOS) attack), caching (e.g., for faster edge node performance, the monitoring component (205) may cache (temporarily save) response data), encryption (e.g., the monitoring component (205) may be configured to decrypt all incoming requests and encrypt all outgoing responses, in order to free up some of the resources of the edge node (200)), etc. In order to provide the aforementioned functionalities, the monitoring component (205) may (i) monitor health, availability, and latency of each component of the system (e.g., 100, FIG. 1), and (ii) perform one or more policies that have been configured around regulatory requirements.

In one or more embodiments, because components of the edge node (200) store and manage business-critical data and applications (e.g., services), security is one of the key aspects while designing the edge node (200). To achieve this, as an additional, active, standby, and reliable security layer, the monitoring component (205) may be deployed between (or disposed between) a firewall of the edge node (200) and other components of the edge node (200) so that, for example, (i) each component behind the monitoring component (205) may remain intact, and (ii) business-critical data and services and their disaster recovery mechanisms may not directly exposed to a network (because, in general, most of applications and/or services provided by a data center are directly exposed to a network with the protection of a single firewall layer, and in case of any attack or disaster, the data center may be vulnerable to direct attacks or impacts).

In one or more embodiments, the monitoring component (205) may also, for example (but not limited to): ensure multi-site resiliency and disaster recovery (e.g., the collector (210) may redirect network traffic to the closest or best performing edge node, or to healthy edge nodes if there is an outage), improve edge node performance and availability (for example, if network traffic is not distributed appropriately across edge nodes, one edge node may become oversubscribed while another is underutilized, and with its network traffic management functionality, the monitoring component (205) may ensure that the load is balanced more evenly across edge nodes for an optimal user experience), improve scalability and agility of edge nodes, implement load balancing and reduce latency in edge nodes (by ensuring that no single edge node is overloaded with too many valid requests), satisfy regulatory and security requirements (e.g., configuration parameters), etc.

In one or more embodiments, the collector (210) may include functionality to, e.g.: (i) monitor (or track), over a network, network traffic (including network traffic logins) between (a) an edge device (e.g., 110A, 110B, etc., FIG. 1) and an edge node (e.g., 120A, 120B, etc., FIG. 1), (b) the edge node and a cloud device (e.g., 140, 150, etc., FIG. 1), and vice versa to obtain a first dataset (described below), (ii) monitor, over the network, activities on the edge device to obtain a second dataset (e.g., an activity record that documents an activity in a configurable level of detail (described below)), (iii) intercept, identify, and accept/reject (in conjunction with the engine (230)) a request/call (e.g., an encrypted request, a DNS request, an Internet control message protocol (ICMP) request, a network access request to initiate a hacking attack, a data access request, etc.) received from an entity (e.g., a valid/trusted client, a compromised user, an invalid user, a malicious insider, a credential/data thief, a negligent insider, etc.) before it arrives its targeted destination, (iv) based on (iii) and configuration parameters (e.g., the request ruleset, the response ruleset, described above in reference to FIG. 1), determine as to whether the intercepted request is valid, (v) based on the determination performed in (iv), infer (or identify), for example, a user that initiated the request has the necessary credentials (e.g., a required level of user priority) and/or is authorized to access data within the edge node (200), the intercepted request is a valid request (e.g., the request sent by an authorized/trusted user, the request is an authentic request, etc.) or an invalid request (e.g., the request is related to a network attack initiated by a hacker), etc., (vi) based on (v), tag the request as an invalid request (e.g., an abnormal request) and reject (by taking a preventive/proactive policy action) the invalid request (so that (a) unauthorized entities cannot access to business-critical data within the edge node (200) and/or within the cloud devices (e.g., 130, FIG. 1) (indirectly), and (b) a data transfer operation may not be initiated unless and until the collector (210) validates the request), (vii) based on (vi), send a fake response (or a fake notification) to the malicious sender (e.g., the hacker) that initiated the invalid request, (viii) based on (v), tag the request as a valid request and process the valid request, (ix) provide an additional layer of security/authentication mechanism (on top of a firewall of the edge node (200)) during any type communication/transaction/operation (a) for maximum data security, integrity, and availability, and (b) to prevent initiation of any invalid/bogus data operation, (x) receive outgoing network traffic (e.g., data packets or other communication protocol compliant data structures) from the monitoring component's database that is planned to be transmitted to another device. (xi) based on (x), verify (and filter some of the outgoing network traffic if necessary) that the outgoing network traffic satisfies one or more attribution rules specified in the configuration parameters (e.g., verify the validity of the outgoing network traffic), (xii) based on the verification performed in (xi), initiate transmission of the outgoing network traffic to the corresponding device, (xiii) obtain (or receive) telemetry data (e.g., resource utilization levels, logs, alerts (e.g., predictive alerts, proactive alerts, technical alerts, etc.) triggered at the corresponding device, etc.) associated with one or more components of an edge device (to infer, for example, a change in the health status of the edge device (e.g., in real-time)) because of an unexpected event (e.g., fan failure is reported, overheating of CPU is reported, memory module failure is reported, power module failure is reported, a security incident is reported, etc.)), (xiv) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) regarding the edge devices (e.g., 110A, 110B, etc., FIG. 1), (xv) monitor performance and/or health of each component of an edge device (e.g., 110A, 110B, etc., FIG. 1) by obtaining (e.g., gathering) telemetry data about each component, (xvi) send the aforementioned data (e.g., the first dataset, the second dataset, intercepted requests and/or responses, credentials of a user, tagging information of a request and/or are response, characteristics of outgoing network traffic, obtained telemetry data and resource utilization levels of an edge device, performance and health details of each component of an edge device, etc.) to the analyzer (220), and (vii) store (temporarily or permanently) the aforementioned data in the monitoring component's database.

As used herein, (i) a "malicious insider" is a user who intentionally hurt the organization, whether through data theft or by sabotage, (ii) a "negligent insider" is a user who unintentionally put the organization's security at risk, and (iii) a "credential/data thief" is an outside infiltrator who enters the organization through, for example, an employee account.

In one or more embodiments, the first dataset may include, for example (but not limited to): a request/call, a type of a request (e.g., a "get" request, a "delete" request, an "update" request, a "post" request, etc.), a response to a request (e.g., a response to an API call), a type of a response, corresponding response time for a request, a size of a request, a size of a response, etc. The request and response to the request may be communicated over a network. In one or more embodiments, corresponding response time may be a period of time, with a definite start and end, within which a response process is set to be completed. Further, the collector (210) may periodically obtain a first dataset from network traffic. The collector (210) may also obtain a first dataset from network traffic in real-time.

In one or more embodiments, the second dataset may include (or document the following metadata), for example (but not limited to): date and time an application window is opened, a name of an application being used by a user, information in a title bar of an application, a configurable amount of content in an application window, a user account used to access an application, a file system path in which content was stored, a file system path to which content was stored, data being accessed/transferred via a network connection, etc. Accordingly, the second dataset may be a string or series of strings that includes (file system) metadata that documents user activities.

In one or more embodiments, after decrypting (if necessary) an intercepted request (in conjunction with the engine (230)), the collector (210) may determine (e.g., inspect, perform feature engineering based on a historical record under the provided/obtained IP address information, etc.) the request (and its corresponding details) in accordance with rules/policies set by an administrator of the edge node (200) to extract useful information, for example (but not limited to): API information associated with the intercepted request, IP address information of the targeted destination, a text length of the intercepted request, a body of the intercepted request, a header of the intercepted request, IP address information (e.g., identity) of an entity (e.g., a data consumer, a computing device, etc.) that sent the request, etc.

In one or more embodiments, during the above determination, if the historical record of the provided/obtained IP address information is empty, the intercepted request may be an abnormal request or may be a normal request that is sent by another authorized user. In one or more embodiments, the collector (210) may then store (temporarily or permanently) a copy of the extracted information in the monitoring component's database. In one or more embodiments, while the collector (210) analyzes the intercepted request, the collector (210) may concurrently continue to provide its services to the edge node (200) to provide maximum level data protection, integrity, and availability for the components (see FIG. 1) of the edge node (200). For example, while analyzing an intercepted request/call/incoming network traffic, the collector (210) may also intercept another request/call/incoming network traffic in parallel.

In one or more embodiments, as mentioned above, the collector (210) (i) may operate as a reverse proxy (e.g., a unidirectional proxy, a reverse proxy agent, an interceptor, etc.) (or may be configured to operate in a reverse proxy mode) to intercept and scrutinize all incoming requests/calls/network traffic from a network (that are allowed or not allowed (but bypassed) a firewall of the edge node (200) (as the first layer of security)) towards the corresponding edge node component to prevent any malicious attacks (e.g., hacking/data hijacking attacks, DDOS attacks, etc.), and (ii) may operate in various different OS architectures based on OS wrapper packaging (e.g., Linux®, Docker®, Microsoft® Windows, etc.), or in any embedded OS, any network OS, any real-time OS, any open source OS, any OS for mobile computing devices, etc.

As being a reverse proxy and an additional layer of security, the collector (210) may also monitor all the outgoing responses/calls/network traffic and notify the monitoring component's database to log their details. To enable these (and the aforementioned) functionalities of the collector (210), the monitoring component (205) may be deployed in-line and between a firewall and other components of the edge node (200).

In this manner, for example, (i) all network traffic may pass through the monitoring component (205) before arriving at a destination within the edge node (200) (e.g., the collector (210) may manage all incoming requests from an edge device (e.g., 110A, 110B, etc., FIG. 1), and direct the valid requests to one or more services provided by the edge node), (ii) the collector (210) may forward, re-route, load-balance, or otherwise provide the received network communication (e.g., data packets) to the corresponding component of the edge node (200), (iii) the collector (210) may block an invalid request/call/network traffic, and (iv) the collector (210) may filter (e.g., drop) some of the outgoing network traffic (i.e., data packets or other communication protocol compliant data structures) that is planned to be transmitted.

In one or more embodiments, the collector (210) may include any logic, business rule, function, and/or operation for optimizing, accelerating, or otherwise improving the performance, operation, and/or quality of service of outgoing network traffic or the delivery of data packets at the network.

In this manner, the collector (210) may (a) regulate (or manage) data transfer rates (e.g., data transfer via a high priority network slide that implements a high communication BW network capacity, data transfer via a low priority network slice that implements a low communication BW capacity, etc.) and data receipt rates in conjunction with the engine (230), (b) coordinate with the engine (230) to manipulate, adjust, simulate, change, improve, or otherwise adapt the behavior of a predetermined data transfer protocol to improve performance of delivery, data rates and/or communication BW utilization of the network. (c) implement (in conjunction with the engine (230)) a data transfer/flow control method (e.g., a pre-acknowledgement method, a window virtualization method, a re-congestion method, a local re-transmission method, a wavefront detection and disambiguation method, a transaction boundary detection method, a re-packetization method, etc.), and (d) measure and monitor the performance of any acceleration technique performed by the engine (230), such as secure socket layer (SSL) offloading, load balancing and/or content switching, connection pooling and multiplexing, caching, and compression.

In one or more embodiments, telemetry data may be obtained as they become available or by the collector (210) polling the corresponding edge device (e.g., 110A, 110B, etc., FIG. 1) (by making an API call to the corresponding edge device) for new data. Based on receiving the API call from the collector (210), the corresponding edge device may allow the collector (210) to obtain the data.

In one or more embodiments, telemetry data may be obtained (e.g., may be dynamically fetched, streamed, etc.) continuously (without affecting production workloads of the corresponding edge device), as they generated, or they may be obtained in batches, for example, in scenarios where (i) the collector (210) receives a failure score calculation request, (ii) the corresponding edge device accumulates the information and provides them to the collector (210) at fixed time intervals, or (iii) the corresponding edge device stores the information in its storage (or in an external entity) and notifies the collector (210) to access the information from its storage or from the external entity. In one or more embodiments, the information may be access-protected for the transmission from the corresponding edge device to the collector (210), e.g., using encryption.

In one or more embodiments, telemetry data may include (or may specify), for example (but not limited to): an application log (described below), a system log (described below), a type of a workload utilized by a user, an SLA/SLO set by a user, a product identifier of an edge device, computing resource utilization data (or key performance metrics including estimates, measurements, etc.) (e.g., data related to a user's maximum, minimum, and/or average CPU utilizations, an amount of storage or memory resource utilized by a user, an amount of networking resource utilized by user to perform a network operation, etc.) regarding the resources of an edge device, a setting of a mission critical application executing on an edge device, a size of each of the set of assets protected, a number of each type of a set of data protection policies implemented by an administrator, a number of each type of a set of assets protected by an edge device, a job detail (e.g., how many data protection policies execute at the same time; based on a configured data protection policy, how many assets are being backed up; a type of a job, such as a data protection job, a data restoration job, a log retention job, etc.), etc.

In one or more embodiments, application logs may include (or specify), for example (but not limited to): warnings and/or errors (e.g., unknown software exception (0xc00d) occurred in the application at location 0x0007d) occurred in a software component, an identifier (e.g., a name) of an asset, an identifier of a parent folder containing an asset (where the parent folder may be a folder that is one level higher than a current directory of an asset in a file system hierarchy), a size of an asset (where the size of an asset may specify how much storage volume the asset consumes), an offset for data of an asset stored in storage (where the offset for an asset's data may be a pointer that points to one or more blocks of storage that store the data), one or more attributes of an asset (which may specify, for example, Asset A should be read-only, Asset B should be hidden, etc.), an access control list (ACL) of an asset (which may specify a user with a user level of 7 (out of 10) or above can access the asset), a discrete file system activity data that is recorded in an agent (e.g., a timestamp of an activity, an identifier of a user who interacted with an asset, an identifier of a computing device, a timestamp showing when a specific request is processed by an application, etc.), a type of an asset, a number of users interacting with an asset, a number of asset size changes, an identifier of an application, a product identifier of an application, a type of an activity (e.g., asset read, asset created, asset modified, asset renamed, asset copied, asset deleted, asset access denied, asset security changed, asset moved, etc.), a description of an activity, a directory of a source asset, a type of a file system (e.g., NTFS, ReFS, etc.), a version of an application, a version of an OS, a hardware identification number of an edge device, etc.

In one or more embodiments, system logs may include (or specify), for example (but not limited to): a media access control (MAC) address of an edge device, a type of an edge device, an identifier of an OS executing on a computing device, a network connectivity detail (e.g., a network identifier, a category of the network, etc.) of an edge device, transition of device states, an alert for medium level of CPU overheating, an alert indicating that a recommended maximum CPU operating temperature is exceeded, keywords for a hardware component (e.g., recommended maximum CPU operating temperature is 75° C.), a transition from one device state to another device state (e.g., fan failure→overheating of CPU, fan failure→memory module failure, etc.), an alert indicating that a recommended maximum CPU operating temperature is exceeded, a port number, a protocol type associated with a port number, computing resource details and an IP address of an edge device, a number of hardware components (e.g., fans, CPUs, GPUs, etc.) deployed to an edge device, a status of a hardware component operating on an edge device, etc.

In one or more embodiments of the invention, keywords and/or alerts for a hardware component or a computing device may be selected/defined by a vendor of the device, by a technical support specialist, by another individual or entity, or any combination thereof. The keywords and/or alerts may be specific technical terms or vendor specific terms that are used in the system log files.

In one or more embodiments, the collector (210) may monitor service performance and resource utilization of each component of an edge device (for, for example, troubleshooting and optimization) by obtaining telemetry data about each component's technology stack (e.g., telemetry data about computing resources of each component) from the corresponding device. In one example, the collector (210) may: (i) monitor actions being performed, computation power being consumed, communications being sent or received, etc. by each component, (ii) monitor communications being sent or received by each component by intercepting them as they traverse from one component to another, (iii) based on the intercepted communications, determine utilization rates of one or more resources by a component, and (iv) store (temporarily or permanently) the resource utilization rates (e.g., including estimates, measurements, etc.) in the monitoring component's database.

In one or more embodiments, while monitoring, the collector (210) may need to, for example (but not limited to): inventory a component, obtain a type and a model of a component, obtain a version of firmware or other code executing on a component, obtain information regarding a resource that may be allocated to a component, obtain information specifying a component's interaction with one another, etc.

One of ordinary skill will appreciate that the collector (210) may perform other functionalities without departing from the scope of the invention. When providing its functionalities, the collector (210) may perform all, or a portion, of the methods illustrated in FIG. 3.1. The collector (210) may be implemented using hardware, software, or any combination thereof.

In one or more embodiments, the analyzer (220) may include functionality to, e.g.: (i) receive (or obtain) data (e.g., the first dataset, the second dataset, intercepted requests and/or responses, credentials of a user, tagging information of a request and/or are response, characteristics of outgoing network traffic, obtained telemetry data and resource utilization levels of an edge device, performance and health details of each component of an edge device, etc.) from the collector (210), (ii) based on (i) and by employing a set of linear, non-linear, and/or ML models, analyze (without the requirement of resource-intensive efforts) the obtained data to extract useful and detailed insights (e.g., relevant data, described below) to infer issues in relation to an edge device (e.g., 110A, 110B, etc., FIG. 1), the edge node (200), and/or a cloud device (e.g., 140, 150, etc., FIG. 1) early in the cycle and to notify the corresponding entities (e.g., administrators); (iii) based on relevant data, derive a continuous average resource utilization value for each component of an edge device with respect to each resource (e.g., a processing resource, a networking resource, etc.); (iv) based on the relevant data, derive a minimum and a maximum resource utilization values for each component of an edge device with respect to each resource; (v) based on (ii)-(iv), identify (a) which components of the edge device are healthy (e.g., a component that is operational, an application that executes on a component generates a response to a request, etc.), and (b) which components of the edge device are unhealthy (e.g., a component that is down, an application that executes on a component does not generate a response to a request, an over-provisioned application, a component is slowing down in terms of performance, a component's resource utilization value is exceeding a predetermined maximum resource utilization value threshold, an application is unhealthy because its status code is 503, etc.); (vi) based on (ii)-(iv), build observability (by employing a set of linear, non-linear, and/or ML models) for each component of the edge device in order to identify health of each component; (vii) based on (ii)-(iv), obtain a current state of the edge device and a current state of the edge device; (viii) based on (vii) and by employing a set of linear, non-linear, and/or ML models, infer a future state of the edge device and a future state of the edge device, (ix) based on the future state of the edge device and the future state of the edge device, automatically react and generate alerts if (a) the future state of the edge device indicates a failure score of the edge device is greater than or equal to a predetermined failure score; (x) based on relevant data, identify a user profile of a user (e.g., a profile that indicates, at least, how the edge device has been utilized by a user); (xi) based on (viii) and (ix), manage health of the edge device; (xii) by employing a set of linear, non-linear, and/or ML models, analyze the first dataset to generate a network traffic analysis output (see FIGS. 4.1 and 5.1), (xiii) by employing a set of linear, non-linear, and/or ML models, analyze the second dataset to generate an activities analysis output (described below), (xiv) because of increased network traffic (e.g., an increased amount of requests, an increased amount of responses, an increase in a size of a request, an increase in a size of a response, etc.), determine latency (e.g., delay) in the network, (xv) because of the latency determined in (xiv), notify the corresponding NSP, (xvi) provide sensitive data profiling/data analysis and different degrees of threat detection (or risk profiling), (xvii) provide output(s) of the above-discussed processes in (ii)-(xi) to other entities (e.g., the engine (230), administrators, etc.), and (xviii) store (temporarily or permanently) the aforementioned data and/or the output(s) of the above-discussed processes in (ii)-(xi) in the monitoring component's database.

In one or more embodiments, if the models that are used by the analyzer (220) are not operating properly (e.g., are not providing the above-discussed functionalities), the models may be re-trained using any form of training data and/or the models may be updated periodically as there are improvements in the models (e.g., the models are trained using more appropriate training data).

In one or more embodiments, extracted relevant data may include (i) information regarding how an edge device (e.g., 110A, 110B, etc., FIG. 1) has been utilized by the corresponding entity (e.g., a user, another edge device, etc.) and (ii) information regarding how the edge node (200) has been utilized by the corresponding entity, for example (but not limited to): an application log, a system log, an alert, a hardware component trap, an keyword, a type of a workload utilized by a user of an edge device, a type of a workload utilized by a user of the edge node (200), an SLA/SLO set/tested by a user, computing resource utilization data regarding the resources of an edge device, a data protection policy implemented/tested by a user, a number of each type of a set of assets protected by an edge device, a size of each of a set of assets protected by an edge device, a number of each type of a set of data protection policies implemented by a user, etc.

In one or more embodiments, for example, while analyzing the second dataset (including, at least, malicious user activities, non-malicious user activities, etc.), the analyzer (220) may also determine/detect risk scores of assets, risk levels of users, and potential threats. In one or more embodiments, the analyzer (220) may implement threat detection algorithms to determine whether the second dataset includes indication of threats.

The threat detection algorithm may evaluate the second dataset and if an abnormal (e.g., malicious) activity is detected, the threat detection algorithm may notify the engine (230) to issue an alert (e.g., a data loss prevention (DLP) alert). In one or more embodiments, the threat detection algorithm may further quantify the risk resulting from abnormal activities. A higher score (indicating the user is a high-risk user) may indicate an elevated risk thus warranting an alert, whereas a lower score (indicating the user is a low-risk user) may not necessarily trigger an immediate alert. The detection of abnormal activities may be based on a comparison with typical, i.e., expected activities. For example, a user activity (inferred from the second dataset) may be compared to typical behavior of the user, as per the user's role in the organization. Examples for abnormal user behavior incompatible with the user's role include (but not limited to): an engineer copying a customer list to an external storage device, a salesman copying confidential engineering records to an external storage device, etc.

Alternatively, or additionally, the detection of an abnormal user behavior may be based on a comparison with a historical user behavior and/or data from previous insider-threat cases. For example, an organization's employee that primarily relied on the Internet to research suppliers' products, but recently started to use the Internet in order to contact with direct competitors of the organization may also be considered suspicious.

Further, the threat detection algorithm may compare a resource activity documented in an activity record with a historical and/or typical resource activity. For example, a sustained access to an HDD may be considered suspicious if the accessed HDD has historically been mostly idle. Other methods for performing threat detection may be implemented by the analyzer (220) without departing from the scope of the invention. Threat detection may, for example, involve a human operator, e.g., a security expert, performing a manual threat detection and/or a manual review of threats detected by the analyzer (220).

In one or more embodiments, the analyzer (220) may include one or more APIs to permit interaction with the engine (230) and/or with a third-party system, for example, (i) to share activity records and detected threats, (ii) to access threat analysis algorithms and/or threat detection algorithms, and (iii) to download threat detection/analysis algorithms and potentially set them up to replace currently used algorithms.

In one or more embodiments, the activities analysis report may include (or specify), for example, malicious user activities, in which malicious user activities may be grouped under one or more categories, for example (but not limited to): reconnaissance, circumvention, obfuscation, aggregation, exfiltration, etc. Each category may specify one or more alerts associated with the activities, for example (but not limited to): (i) obfuscation—data archive creation and deletion, obfuscation/behavioral—unconfirmed asset downloaded, obfuscation—suspicious archive asset renaming, obfuscation—elevated user privileges (e.g., an attempt to use administrator credentials), obfuscation—suspicious/unapproved software installation, obfuscation/compromised—unsecured protocol communication (e.g., http) usage, obfuscation—data encrypted, obfuscation/compromised—signed binary proxy execution, obfuscation/compromised—command line interface execution, obfuscation—excessive asset deletion: greater than 50 unique assets; (ii) reconnaissance—security bypass research; (iii) aggregation—compressed data, aggregation/behavioral—exfiltration archive collected data generation, aggregation—data archiving, aggregation—screen capture software; (iv) exfiltration/data loss—attempt to transfer an asset to an unauthorized removable storage media, exfiltration—obfuscated Internet asset upload, exfiltration—archive collected data movement, exfiltration—archive collected data archive generation, exfiltration—asset transfer protocol, data loss/exfiltration—abnormal transfer: sum of exfiltrated asset size greater than 350 MB, exfiltration—remote access utility upload, exfiltration/data loss—asset sharing website network activity; etc.

One of ordinary skill will appreciate that the analyzer (220) may perform other functionalities without departing from the scope of the invention. When providing its functionalities, the analyzer (220) may perform all, or a portion, of the methods illustrated in FIG. 3.1. The analyzer (220) may be implemented using hardware, software, or any combination thereof.

In one or more embodiments, the engine (230) may include functionality to, e.g.: (i) receive (or obtain) data (e.g., analysis outputs and/or other related data) from the analyzer (220), (ii) receive one or more identifiers (or identifier-based information, described below) from an administrator, (iii) based on (i) and (ii), understand network traffic between components of the system (e.g., 100, FIG. 1), (iv) based on the understanding performed in (iii) and in order to secure communication between devices (of the system (e.g., 100, FIG. 1)), tag/group/categorize an edge device under a "secured devices" category (see FIGS. 4.2 and 5.2) or an "unsecured devices" category (see FIG. 4.2), (v) based on (iv), make a determination as to whether the edge device is tagged under the "unsecured devices" category, (vi) based on (v) and an identifier (e.g., a type of an insecurity), tag (further) the edge device under the corresponding "unsecured devices" sub-category (e.g., "default password", see FIG. 4.2), (vii) upon tagging the edge device under the corresponding "unsecured devices" sub-category and based on the activities analysis output (obtained from the analyzer (220)), make a second determination as to whether any malicious activity is detected in the activities analysis output, (viii) based on (vii), implement a high-level security policy (e.g., DLP policy-zero trust level 4, described below) to disrupt the malicious user of the edge device and immediately suspend the edge device's communication with other devices operating on the system (e.g., 100, FIG. 1), (ix) based on (i) and by employing a set of linear, non-linear, and/or ML models, make one or more determinations/outputs with respect to (a) the health status of the corresponding edge device(s) and (b) performance issues occurred in the corresponding edge devices (for example, which application was down while processing a specific request, which request caused an application to went down, what is the health of an application and its dependencies, etc.), (x) based on the performed determinations in (ix), provide one or more recommendations to an administrator of the corresponding edge devices to manage the health of those devices, (xi) via its recommendation monitoring service, monitor whether a provided recommendation is implemented by the administrator, and (xii) store (temporarily or permanently) the aforementioned data and/or the output(s) of the above-discussed processes in (iii)-(xi) in the monitoring component's database.

In one or more embodiments, the identifier-based information may include, for example (but not limited to): a way of communication (e.g., "one way" communication, "two way" communication, etc.), a category of a device (e.g., a camera, a smart television, etc.), a geographical location of an edge device (e.g., a location may be identified using, for example, a global positioning system (GPS) and/or any other known or later discovered mechanisms), a security measure in relation to an edge device (e.g., a default password), network traffic based intersection of devices (e.g., edge devices that are communicating with Edge Node F, where those edge devices are not dependent to each other; however, when Edge Node F is down, the edge devices are also down), workload balance based devices (e.g., to perform workload redistribution among the components of the edge devices to mange the overall operation of the edge devices), etc.

In one or more embodiments, the administrator (who provided the identifiers) may request (i) the smart and identifier-based dynamic grouping of the devices and (ii) securing communication of the devices to be performed in a "grouping order" specified by the administrator. For example, based on an organization's policy, the order may specify/indicate "security" as the first identifier (see FIG. 3.1), "location" as the second identifier (see FIG. 3.3), "type of the insecurity" as the third identifier (see FIG. 3.2), and "encryption" as the fourth identifier (see FIG. 3.3). The aforementioned example is not intended to limit the scope of the invention.

In one or more embodiments, the engine (230) or a third-party system may determine/set suitable threat prevention steps based on one or more risk-based adaptive DLP policies. As used herein, "zero trust" may refer to a model that provides security against, for example, ransomware and cybersecurity threats by assigning the least required access needed to perform specific tasks. In general, this model operates based on the following principles: (i) always authenticate and authorize based on all available data points (e.g., user identity, user location, computing device health, etc.), (ii) limit user access with just-in-time- and just-enough-access and data protection to secure both data and production workloads, and (iii) minimize blast radius and segment access by implementing end-to-end encryption.

In one or more embodiments, each policy type may include one or more threat mitigation instructions. For example, instructions of "DLP policy—zero trust level 1 (detect)" may specify (but not limited to): user 1 is a low-risk user and user 1 does not normally handle (e.g., touch) sensitive assets, thus no DLP enforcements are needed; user 1 is a low-risk user and user 1 does not normally touch (e.g., read, write, etc.) sensitive assets, thus user 1 can stay in the network; etc. As yet another example, instructions of "DLP policy—zero trust level 2 (deter)" may specify (but not limited to): user 2 is a low-risk user; however, user 2 starts to download assets from a risky website, thus positive DLP enforcements are needed; user 2 is a high-risk user; however, activities of user 2 are non-malicious (e.g., not downloading assets from a risky website), thus teachable moment emails/messages need to be sent to user 2; user 2 is a low-risk user; however, user 2 starts to download assets from a risky website, thus user 2 needs to take a teachable moment security awareness training; etc.

Further, instructions of "DLP policy—zero trust level 3 (deter)" may specify (but not limited to): user 3 is a high-risk user and user 3's activities are non-malicious; however, in general, user 3 acts risky (e.g., frequently travels), thus implement approved device enforcements and more intrusive monitoring (e.g., turn on user 3's webcam, record user 3's screen, etc.) on user 3; user 3 is a high-risk user and user 3's activities are non-malicious; however, user 3 handles sensitive assets, thus implement approved application enforcements and automatically lock user 3's external, removable storage media; etc. As yet another example, instructions of "DLP policy—zero trust level 4 (disrupt)" may specify (but not limited to): user 4 is a high-risk user, user 4 normally handles sensitive assets, and user 4's activities are malicious, thus implement session lock-out enforcements on user 4; user 4 is a high-risk user, user 4 normally handles sensitive assets, and user 4's activities are malicious, thus remove user 4 completely off the organization's network; etc. The aforementioned examples are not intended to limit the scope of the invention.

In one or more embodiments, if the models that are used by the engine (230) are not operating properly (e.g., are not providing the above-discussed functionalities while (i) the collector (210) constantly monitoring network traffic and activities (described above) performed on edge devices, and (ii) the engine (230) restricts/secures unsecured edge devices based on the activity), the models may be re-trained using any form of training data and/or the models may be updated periodically as there are improvements in the models (e.g., the models are trained using more appropriate training data so that, for example, regrouping of an edge device may be performed (if necessary)). In one or more embodiments, training data may include (or may be), for example (but not limited to): a minimum user count (using an edge device), a maximum user count (using an edge device), a device state chain (and its components (e.g., device states)), telemetry data, sensor data, etc.

In one or more embodiments, before performing their duties, each component of the monitoring component (205) (e.g., models (e.g., an ML model, a pattern matching model, etc.) used by each component) may first go through a training phase using training data (described above). The training phase may be performed at different points-in-time, may be performed repeatedly (e.g., performing training, then monitoring, then training, then monitoring, etc.), or may otherwise be utilized to provide each component's functionality.

One of ordinary skill will appreciate that the engine (230) may perform other functionalities without departing from the scope of the invention. When providing its functionalities, the engine (230) may perform all, or a portion, of the methods illustrated in FIGS. 3.1-3.3. The engine (230) may be implemented using hardware, software, or any combination thereof.

In one or more embodiments, (i) as being a part of the monitoring component (205) and (ii) as being a physical device, a logical intelligence, or a combination thereof (e.g., a computing device that supports virtualized application environments and/or provides virtualized application services), the monitoring component's database may provide less, the same, or more functionalities and/or services (described above) comparing to the database (e.g., 150, FIG. 1). One of ordinary skill will appreciate that the monitoring component's database may perform other functionalities without departing from the scope of the invention.

In one or more embodiments, the collector (210), the analyzer (220), the engine (230), and the monitoring component's database may be utilized in isolation and/or in combination to provide the above-discussed functionalities. These functionalities may be invoked using any communication model including, for example, message passing, state sharing, memory sharing, etc. By doing so, the monitoring component (205) may address issues related to data security, integrity, and availability proactively.

FIGS. 3.1-3.3 show a method for smart recommendation and dynamic grouping of devices in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed monitoring component (e.g., 205, FIG. 2). Other components of the distributed system (100) illustrated in FIG. 1 may also execute all or part of the method shown in FIG. 3.1 without departing from the scope of the invention.

In Step 300, the monitoring component (or more specifically, e.g., the collector (e.g., 210, FIG. 2)) monitors (or tracks in real-time), over a network, network traffic (including network traffic logins) between (i) an edge device (e.g., 110A, FIG. 1) and an edge node (e.g., 120A, FIG. 1), (ii) the edge node and a cloud device (e.g., 140, FIG. 1), and vice versa to obtain a first dataset. Certain exemplary details of the first dataset have been described above in reference to FIG. 2.

In Step 302, the monitoring component (or more specifically, e.g., the collector)) monitors (or tracks in real-time), over the network, activities on the edge node to obtain a second dataset. Certain exemplary details of the second dataset have been described above in reference to FIG. 2.

In Step 304, the monitoring component (or more specifically, e.g., the analyzer (e.g., 220, FIG. 2)) obtains data (e.g., the first dataset, the second dataset, intercepted requests and/or responses, credentials of a user, tagging information of a request and/or are response, characteristics of outgoing network traffic, obtained telemetry data and resource utilization levels of the edge device, performance and health details of each component of the edge device, etc.) from the collector. Thereafter, by employing a set of linear, non-linear, and/or ML models, the analyzer may proactively analyze (without the requirement of resource-intensive efforts) the first dataset to generate a network traffic analysis output (see FIGS. 4.1 and 5.1). Certain exemplary details of the telemetry data and resource utilization levels (or resource utilization data) have been described above in reference to FIG. 2.

In Step 306, by employing a set of linear, non-linear, and/or ML models, the monitoring component (or more specifically, e.g., the analyzer) analyzes the second dataset to generate an activities analysis output. Certain exemplary details of the second dataset have been described above in reference to FIG. 2. In addition to the data obtained in Step 304, the analyzer may also obtain (from the collector) one or more alerts that are triggered at the edge device. For example, based on a failed cloud disaster recovery operation (which is initiated by a user), the edge device may generate a failure alert.

Further, based on the telemetry data, resource utilization levels, and triggered alerts, the analyzer may, for example (but not limited to): infer operations performed and/or failures occurred in the edge device, infer one or more reasons of those failures, infer issues (e.g., for troubleshooting) in relation to the edge device early in the cycle and notify the corresponding entities (e.g., administrators), how the "healthy state" (e.g., the nominal state) of the edge device is transitioned into the "unhealthy state", obtain input(s) regarding how the edge device has been utilized by a user of the edge device, infer (e.g., in conjunction with the engine (e.g., 230, FIG. 2)) what type of fixes need to be implemented at the edge device for a better device management and user experience, infer (in conjunction with the engine) whether or not a user is satisfied with, at least, the performance, reliability, scalability, etc. of the edge device, derive a continuous average resource utilization value for each component of the edge device with respect to each resource, derive a minimum and a maximum resource utilization values for each component of the edge device with respect to each resource, etc.

In one or more embodiments. (i) based on the telemetry data, resource utilization levels, and triggered alerts, and (ii)

by employing a set of linear, non-linear, and/or ML models, the analyzer may obtain a current state (e.g., healthy, unhealthy, overheating, critical, warning, normal, etc.) of the edge device. In one or more embodiments, the current state (or the current device state) of the edge device may be a state in which an edge device failure was reported. In one or more embodiments, an unhealthy state (e.g., a compromised health state) may indicate that the edge device has already or is likely to, in the future, be no longer able to provide the computing resources (or services) that it has previously provided (e.g., the edge device is operating outside of its expected operating parameters (which may be defined, for example, by a vendor, a user, any other entity, or any combination thereof)).

In one or more embodiments, a healthy state may correspond to a device state in which the edge device is operating as expected. The health state determination may be made via any method based on aggregated health information without departing from the scope of the invention.

Thereafter, based on the current state (and previously obtained/observed states) of the edge device and by employing a set of linear, non-linear, and/or ML models (e.g., a conformal prediction model, a Markov chain model, etc.), the analyzer may infer a future state (e.g., a predicted normal state, a predicted failure state, future device state, etc.) of the edge device. In one or more embodiments, among a list of failure states, the predicted failure state may have the highest likelihood to become the predicted failure.

In one or more embodiments, the analyzer may obtain a confidence score (e.g., a prediction quality) of the inferred future state of the edge device. For example, based on the inferred future state and by employing the conformal prediction model, "overheating of edge device's GPU" may be determined as the correct future state with 80% confidence score. The aforementioned example is not intended to limit the scope of the invention.

In one or more embodiments, in order to generate a device state chain for the edge device, the analyzer may, e.g.: (i) when a hardware component failure (e.g., a fan failure) is reported, generate a device state path (e.g., for the edge device) from a healthy device state to an unhealthy device state (to understand how the failure has occurred because there may be a strong correlation between the device state path and a root cause of the failure), (ii) predict a future device state of the edge device based on a current device state of the edge device, and (iii) generate the device state chain using the device state path (which corresponds to the device states up to the current device state), current device state, and future device state. As indicated, while generating the device state chain, not just the previous device state is considered, but the whole device state path is considered. In this manner, for example, performance of the edge device may be tracked over time.

In Step 308, the monitoring component (or more specifically, e.g., the engine) receives one or more identifiers from an administrator (of the corresponding edge node (e.g., 200, FIG. 2)). Certain exemplary details of the identifiers have been described above in reference to FIG. 2.

In Step 310, based on the network traffic analysis output (received from the analyzer), activities analysis output (received from the analyzer), the edge device's device state chain (received from the analyzer), a first identifier (e.g., security, which may be the utmost parameter for the administrator while the edge devices are grouped), and by employing a set of linear, non-linear, and/or ML models, the monitoring component (or more specifically, e.g., the engine) tags/groups the edge device under a "secured devices" category or an "unsecured devices" category.

In this manner, the engine may, for example (but not limited to): impose restrictions to only a certain group of devices (e.g., the edge devices grouped under the "unsecured devices" category), identify a group of (or a link of) unsecured edge devices, focus on a particular unsecured edge devices to secure them and suspend their operations until they become secured, secure the communication between the components of the system (e.g., 100, FIG. 1), provide (for the edge devices that are grouped under the "unsecured devices" category) smart recommendation and rectification, secure one or more edge devices with an improved device management, (if needed) apply a fix to the corresponding edge device, perform regrouping for the corresponding edge device, etc.

These activities may then be annotated (e.g., tagged) for, for example, forensic investigation/reporting and may be marked for further behavioral analysis and anomaly detection routines (e.g., user-to-user, user-to-peer group, and user-to-organization anomalies).

Further, based on the identified health of the edge device (or based on the failure score of the edge device), the engine may tag each component of the edge device accordingly. In order to tag a component based on its identified health, the engine, for example: (i) may employ a set of linear, non-linear, and/or ML models, or (ii) may include one or more configuration instructions. By employing a model or based on configuration instructions, the engine may, for example (but not limited to): tag CPU A as a "LOW" performing CPU, tag fan H as a "HIGH" performing fan, etc.

In Step 312, upon tagging/categorizing the edge device under the related category, the monitoring component (or more specifically, e.g., the engine) makes a first determination as to whether the edge device is tagged under the "secured devices" category. Accordingly, in one or more embodiments, if the result of the first determination is YES (meaning that the edge device is trustworthy (or secure enough) to perform further grouping/categorization under the "secured devices" category), the method proceeds to Step 332 of FIG. 3.3. If the result of the first determination is NO (meaning that the edge device is untrustworthy (or not secure enough) because of, for example, a malicious activity performed on the edge device), the method alternatively proceeds to Step 314 of FIG. 3.2.

Turning now to FIG. 3.2, the method shown in FIG. 3.2 may be executed by, for example, the above-discussed monitoring component. Other components of the system (100) illustrated in FIG. 1 may also execute all or part of the method shown in FIG. 3.2 without departing from the scope of the invention.

In Step 314, as a result of the first determination in Step 312 of FIG. 3.1 being NO (e.g., because of the edge device's behavior) and based on a third identifier (e.g., a type of an insecurity, which may be the third parameter for the administrator while the edge devices are grouped), the monitoring component (or more specifically, e.g., the engine) further tags/groups the edge device under the corresponding "unsecured devices" sub-category.

In one or more embodiments, a type of an insecurity may include (or may be), for example (but not limited to): a usage of a default password (e.g., to log into an edge device, while setting up a port setting, etc.), not setting up a password protection for an edge device (e.g., "no password" sub-category, see FIG. 4.2), a usage of unsecured ports/protocols for communication (e.g., Edge Device A is not communicating with Edge Node A using an SSL- or https-based communication method), being affected by a malicious attack, etc.

In Step 316, after tagging the edge device under its corresponding "unsecured devices" sub-category, the monitoring component (or more specifically, e.g., the engine) makes a second determination as to whether any malicious activity (associated with the edge device) is detected in the activities analysis output (generated in Step 306 of FIG. 3.1). Accordingly, in one or more embodiments, if the result of the second determination is YES, the method proceeds to Step 318. If the result of the second determination is NO, the method alternatively proceeds to Step 322. Certain exemplary details of the malicious activities have been described above in reference to FIG. 2.

In one or more embodiments, while performing the second determination, the engine may use its "user risk model". For example, consider a scenario where User 2 has performed malicious activities on a sensitive asset that resides in the edge device (e.g., generating a data archive using the sensitive asset and deleting the archive afterwards, trying to transfer the sensitive asset to an unauthorized removable storage media, etc.). In this scenario, the engine may identify User 2 as a "bad actor" and may tag, based on the user risk model, User 2 as a "high-risk" user (e.g., as a malicious insider, as a negligent insider, as a credential thief, etc.). For this reason, the activities analysis report may indicate malicious activities associated with the edge device (so that the edge device may be tracked over time for a better device management).

In Step 318, as a result of the second determination in Step 316 being YES and for a better device management, the monitoring component (or more specifically, e.g., the engine) takes one or more preventive (and proactive) actions (e.g., threat preventive actions or security measures recommended by the corresponding DLP policy (e.g., a deter policy, a disrupt policy, etc.)) to prevent the threat. In one or more embodiments, as soon as such malicious activity is detected on the edge device, the engine takes an intrusive action and implements a high-level DLP policy (e.g., DLP policy—zero trust level 4) in order to disrupt the malicious and/or high-risk user of the edge device and to immediately suspend the edge device's communication with the edge node and cloud device (e.g., immediately suspends the edge device's network access (other than its communication with the monitoring component) by deactivating the edge device's ports). Certain exemplary details of the high-level DLP policy have been described above in reference to FIG. 2.

In some cases, in order to implement a security patch on the edge device (or to troubleshoot the edge device), the administrator may elevate user privileges in the edge device. In those cases, the engine (i) will not falsely detect administrator-initiated activities as "malicious activities", (ii) will not implement the high-level security policy, (iii) will not suspend the edge device's network access, and (iv) will not disrupt the administrator.

In Step 320, once the high-level security policy is implemented and the edge device's network access is suspended, the monitoring component (or more specifically, e.g., the engine) may initiate notification of the administrator about the completion of the implementation. The notification may be displayed on a GUI of, for example, the edge node. Thereafter, the engine may store (temporarily or permanently) the reasons and outcomes of the implementation in the monitoring component's database. The method may then end.

In Step 322, (a) as a result of the second determination in Step 316 being NO. (b) using a GUI of the edge device, and (c) for a better device management, the monitoring component (or more specifically, e.g., the engine) sends a reason-based recommendation (e.g., a request, a command, a prompt, etc.) (or multiple issue-based recommendations with minimum amount of latency) to the edge device (or to a user of the edge device) to, at least: (i) notify the user of the edge device that an unsecured state of the edge device needs to be managed/rectified (e.g., by setting up efficient and secure connections (e.g., a virtual private network (VPN) connection (or a trust relationship), an SSL VPN connection, an IP security (IPSec) based VPN connection, a transport layer security VPN (TLS VPN) connection, etc.)), (ii) manage the health of the edge device (e.g., if necessary, the user may contact with a technical support person to resolve the condition of the edge device), (iii) engage with the edge device to provide a better user experience, (iv) modify resource utilization levels of the components of the edge device, (v) suggest (or convince) the user of the edge device about increasing (or decreasing) the resource utilization level of an edge device component (without leveraging against the best practice recommended by the corresponding vendor), (vi) develop and provide a better edge device (with respect to functionality, scalability, reliability, manageability, etc.), (vii) initiate dispatching of a healthy and secured edge device to replace the problematic edge device under a product warranty and to enhance resilience of the IoT network, and (viii) make the edge device more user-friendly (e.g., easy to engage with), easy to use, highly automated, secure, and successful in operation.

In one or more embodiments, the user of the edge device may receive, via a GUI of the edge device, the recommendation (e.g., "please change your default password", "please set up a password", "please uninstall a recently installed service", "please communicate with a secure protocol", "please replace GPU B with another GPU", "please upgrade the version of Application T from version 1.2 to version 1.4 and then restart the edge device", "please implement Security Model R for a better user experience", "please implement Communication Model C", etc.) as pre-loaded instructions (present in the monitoring component's database) and/or via other methods.

In Step 324, after sending the recommendation and via its recommendation monitoring service, the monitoring component (or more specifically, e.g., the engine) makes a third determination as to whether the recommendation is applied by the user (or the edge device is configured by the user based on the recommendation). Accordingly, in one or more embodiments, if the result of the third determination is YES, the method proceeds to Step 326. If the result of the third determination is NO, the method alternatively proceeds to Step 328.

In one or more embodiments, to perform Step 324, the engine may include a recommendation monitoring service. The recommendation monitoring service may be a computer program that may be executed on the underlying hardware of the engine. The recommendation monitoring service may be designed and configured to facilitate remote access to check whether the security and/or health of the edge device has been managed. Based on monitoring, if the user did not take an action, the engine may resend the recommendation to the user. Separately, based on monitoring, if the health of the edge device could not be managed even after implementing the provided recommendation (e.g., the edge device could not transition from the compromised state back to a nominal state), the engine may provide a second recommendation to the user.

In Step 326, as a result of the second determination in Step 324 being YES (e.g., the default password of the edge device has been changed/updated, a state rectification has been done for the edge device, etc.), the monitoring component (or more specifically, e.g., the engine) maintains (or allows) the edge device's communication with the edge node and cloud device (e.g., maintains the edge device's network access).

Thereafter, the engine may initiate notification of the administrator about a current state/status of the edge device and/or about the recommendation that has been applied by the user. The notification may be displayed on a GUI of, for example, the edge node. Thereafter, the engine may store (temporarily or permanently) the reasons and outcomes of Step 326 in the monitoring component's database. The method may then end.

In Step 328, as a result of the third determination in Step 324 being NO, the monitoring component (or more specifically, e.g., the engine) makes a fourth determination as to whether a maximum (recommendation) deferral is reached. Accordingly, in one or more embodiments, if the result of the third determination is YES, the method proceeds to Step 330. If the result of the fourth determination is NO, the engine resends the recommendation to the user using the GUI (where the method alternatively returns to Step 322).

In one or more embodiments, the recommendation may be resent if: (i), based on monitoring, the recommendation has not yet been implemented by the user (even after sending the recommendation multiple times without reaching to the maximum recommendation deferral threshold (e.g., three times)), or (ii) a receipt acknowledgement has not been received by the engine (from the edge device) for the recommendation after a predetermined period of time (to this end, the engine may monitor acknowledgement(s) generated by the edge device so that the engine may determine whether the recommendation has been successfully delivered or needs to be resent).

In Step 330, as a result of the fourth determination in Step 328 being YES (e.g., the user of the edge device has been notified three times (via the recommendation), but still the recommendation has not been applied/implemented) and for a better device management, the monitoring component (or more specifically, e.g., the engine) takes one or more preventive (and proactive) actions (or security measures recommended by the corresponding DLP policy) to rectify the security and/or health state of the edge device. For this reason, the engine takes a rectification action and implements a medium-level DLP policy (e.g., DLP policy—zero trust level 2) in order to warn the user of the edge device and to suspend the edge device's communication with the edge node and cloud device (e.g., to suspend the edge device's network access (other than its communication with the monitoring component) by deactivating the edge device's ports) until the administrator of the corresponding edge node performs the action specified in the recommendation (e.g., "please change your default password") on the edge device.

Once the security and/or health state of the edge device has been rectified (e.g., once the recommended action has been applied to the edge device, once a secure and efficient connection has been established, etc.), the engine allows the edge device's communication with the edge node and cloud device (e.g., maintains the edge device's network access). Thereafter, the engine may initiate notification of the administrator about a current state/status of the edge device. The notification may be displayed on a GUI of, for example, the edge node. Thereafter, the engine may store (temporarily or permanently) the reasons and outcomes of Step 330 in the monitoring component's database. The method may then end.

Turning now to FIG. 3.3, the method shown in FIG. 3.3 may be executed by, for example, the above-discussed monitoring component. Other components of the system (100) illustrated in FIG. 1 may also execute all or part of the method shown in FIG. 3.3 without departing from the scope of the invention.

In Step 332, (i) as a result of the first determination in Step 312 of FIG. 3.1 being YES, (ii) because of the edge device's behavior, (iii) to generate a more dynamic group out of the devices tagged under the "secured devices" category, and (iv) based on a second identifier (e.g., location, which may be the second parameter for the administrator while the edge devices are grouped), the monitoring component (or more specifically, e.g., the engine) further tags/groups the edge device under the corresponding "location" sub-category (see FIG. 5.2).

In this manner, the engine may, for example (but not limited to): enable performing of a workload redistribution among the components of the edge devices to manage the overall operation of the edge devices, enable reducing of the quantity of unnecessary REST API calls that an edge device is responsible for (so that, for example, unnecessary memory utilization of an edge device's component may be prevented), enable modification of a predetermined maximum resource utilization value threshold assigned to the edge device (so that the edge device may take more workloads without choking), make the edge device more user-friendly (e.g., easy to engage with, easy to use, highly automated, successful in operation, etc.), enable an improved device management, enable putting this specific sub-category in maintenance for a seamless upgrade process (e.g., performing an upgrade process only at this location), etc.

In Step 334, (i) because of the edge device's behavior, (ii) to generate a more dynamic group out of the devices tagged under the "secured devices" category, and (iii) based on a fourth identifier (e.g., encryption, which may be the fourth parameter for the administrator while the edge devices are grouped), the monitoring component (or more specifically, e.g., the engine) further tags/groups the edge device under the corresponding "encryption" sub-category.

In this manner, the engine may, for example (but not limited to): enable a functionality to encrypt (e.g., a way of translating data from plaintext (unencrypted) to ciphertext (encrypted), in which encrypted data may be accessed with an encryption key) one or more data chunks that are received only from this specific sub-category using an identifier-based encryption model (e.g., a group ID-based asymmetric encryption method, a device ID-based symmetric encryption model, etc.), enable a functionality to decrypt (e.g., a way of translating data from ciphertext to plaintext, in which decrypted data may be accessed with a decryption key) one or more data chunks that are received only from this specific sub-category using an identifier-based decryption model, make the edge device more user-friendly (e.g., easy to engage with, easy to use, highly automated, successful in operation, etc.), enable an improved device management for more secure edge devices, enable putting this specific sub-category in maintenance for a seamless upgrade process (e.g., performing an upgrade process only for the devices listed under this sub-category), enable a different kind of communication for the devices listed under this sub-category, etc.

In Step 336, once the edge device is tagged under the corresponding "secured devices" sub-category, the monitoring component (or more specifically, e.g., the engine) may initiate notification of the administrator about the completion of the implementation (e.g., the edge device has been tagged for more efficient device management and secure communication). The notification may be displayed on a GUI of, for example, the edge node. Thereafter, the engine may store (temporarily or permanently) the reasons and outcomes of the implementation in the monitoring component's database. The method may then end.

To further clarify embodiments of the invention, a non-limiting example use case is provided in FIGS. 4.1 and 4.2.

Start of Example

The example use case, illustrated in FIGS. 4.1 and 4.2, is not intended to limit the scope of the embodiments disclosed herein and is independent from any other examples discussed in this application.

Turning now to FIG. 4.1, FIG. 4.1 shows a scenario in which upon analyzing a first dataset, the analyzer generates a network traffic analysis output. For the sake of brevity, not all components/parameters of the network traffic analysis output may be discussed in FIG. 4.1.

Assume here that a first portion of the network traffic analysis output shows: (i) source: Edge Device (ED) A, (ii) target: Edge Node (EN) 1, (iii) way of communication: ED A to EN 1 (e.g., one-way communication), (iv) location of source: user data center, (v) location of target: data center, (vi) data category of source: personal identification information (PII) (e.g., user name, user phone number, etc.) is transferred, (vii) data category of target: N/A, (viii) security of source: unsecured due to a default password, and (ix) security of target: secured without a default password.

Further, assume here that a second portion of the network traffic analysis output shows: (i) source: ED B, (ii) target: EN 2, (iii) way of communication: ED B to EN 2 and EN 2 to ED B (e.g., two-way communication), (iv) location of source: user premises, (v) location of target: user premises, (vi) data category of source: PII is not transferred, (vii) data category of target: N/A, (viii) security of source: not secured, and (ix) security of target: not secured.

Further, assume here that a third portion of the network traffic analysis output shows: (i) source: ED C, (ii) target: cloud device (CD) 1, (iii) way of communication: from CD 1 to ED C (e.g., one-way communication), (iv) location of source: user premises, (v) location of target: data center, (vi) data category of source: N/A, (vii) data category of target: PII data is not transferred, (viii) security of source: secured without a default password, and (ix) security of target: secured without a default password.

Turning now to FIG. 4.2, FIG. 4.2 shows a device categorization/grouping diagram for the aforementioned scenario. Based on the network traffic analysis output (refer to FIG. 4.1), activities analysis output (not shown), each edge device's device state chain (not shown), and one or more identifiers (e.g., "security" as the first identifier, "type of the insecurity" as the third identifier, etc.) received from an administrator, the engine (i) first tags/groups ED A (401A) and ED B (401B) under the "unsecured devices" category, (ii) further tags ED A (401A) under the "default password" sub-category (which is a sub-category under the "unsecured devices" category) and further tags ED B (401B) under the "no password" sub-category (which is a sub-category under the "unsecured devices" category), and (iii) tags ED C (401C) under the "secured devices" category.

Thereafter, the engine applies the corresponding restrictions and/or actions on ED A (401A) and ED B (401B) (see FIG. 3.2).

End of Example

To further clarify embodiments of the invention, a non-limiting example use case is provided in FIGS. 5.1 and 5.2.

Start of Example

The example use case, illustrated in FIGS. 5.1 and 5.2, is not intended to limit the scope of the embodiments disclosed herein and is independent from any other examples discussed in this application.

Turning now to FIG. 5.1, FIG. 5.1 shows a scenario in which upon analyzing a first dataset, the analyzer generates a network traffic analysis output. For the sake of brevity, not all components/parameters of the network traffic analysis output may be discussed in FIG. 5.1.

Assume here that a first portion of the network traffic analysis output shows: (i) source: ED A, (ii) target: EN 1, (iii) way of communication: ED A to EN 1 (e.g., one-way communication), (iv) location of source: user data center, (v) location of target: data center, (vi) data category of source: PII is transferred, (vii) data category of target: N/A, (viii) security of source: secured without a default password, and (ix) security of target: secured without a default password.

Further, assume here that a second portion of the network traffic analysis output shows: (i) source: ED B, (ii) target: EN 2, (iii) way of communication: ED B to EN 2 and EN 2 to ED B (e.g., two-way communication), (iv) location of source: user premises, (v) location of target: user premises in a different location, (vi) data category of source: PII is not transferred, (vii) data category of target: N/A, (viii) security of source: secured without a default password, and (ix) security of target: secured without a default password.

Further, assume here that a third portion of the network traffic analysis output shows: (i) source: ED C, (ii) target: CD 1, (iii) way of communication: from CD 1 to ED C (e.g., one-way communication), (iv) location of source: user premises, (v) location of target: data center in a different location, (vi) data category of source: N/A, (vii) data category of target: PII data is not transferred, (viii) security of source: secured without a default password, and (ix) security of target: secured without a default password.

Turning now to FIG. 5.2, FIG. 5.2 shows a device categorization/grouping diagram for the aforementioned scenario. Based on the network traffic analysis output (refer to FIG. 5.1), activities analysis output (not shown), each edge device's device state chain (not shown), and one or more identifiers (e.g., "security" as the first identifier, "location" as the second identifier, etc.) received from an administrator, the engine (i) first tags/groups ED A (501A), ED B (501B), and ED C (501C) under the "secured devices" category, and (ii) (a) further tags ED A (501A) under a first "location" sub-category (which is a sub-category under the "secured devices" category), (b) further tags ED B (501B) under a second "location" sub-category (which is a sub-category under the "secured devices" category), and (c) further tags ED C (501C) under a third "location" sub-category (which is a sub-category under the "secured devices" category).

Thereafter, the engine applies the corresponding actions on ED A (501A), ED B (501B), and ED C (501C) (see FIG. 3.3).

End of Example

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as RAM, cache memory), persistent storage (606) (e.g., a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing edge devices, the method comprising:
    monitoring, over a network, network traffic between an edge device (ED), an edge node (EN), and a cloud device (CD) to obtain a first dataset;
    monitoring, over the network, an activity performed on the ED to obtain a second dataset;
    analyzing the first dataset to generate a network traffic analysis output;
    analyzing the second dataset to generate an activities analysis output;
    performing a first tagging of the ED under as either a secured devices category or an unsecured devices category based on the network traffic analysis output, the activities analysis output, and a first identifier, wherein the first identifier is received from an administrator, making the ED is tagged under the unsecured devices category;
    performing a second tagging, based on the first tagging and a second identifier, of the ED under a corresponding unsecured devices sub-category, wherein the second identifier is received from the administrator;
    upon tagging the ED under the corresponding unsecured devices sub-category and based on the activities analysis output, making a determination that the activity is a malicious activity; and
    implementing, based on the determination, a high-level security policy to disrupt a malicious user of the ED.

2. The method of claim 1, wherein the high-level security policy comprises suspending the ED's network access.

3. The method of claim 2, wherein the first identifier indicates that the ED needs to be tagged based on a security status of the ED first.

4. The method of claim 3, wherein the second identifier indicates that after tagging the ED based on the first identifier, the ED needs to be tagged based on a type of an insecurity.

5. The method of claim 1, wherein the activities analysis output specifies that the malicious activity is a data exfiltration event that occurred when the malicious user attempted to transfer a sensitive asset to an unauthorized removable storage media.

6. The method of claim 1, wherein the activities analysis output specifies that the malicious activity is a data loss event that occurred when the malicious user attempted to upload a sensitive asset to an unauthorized file sharing website using an administrator credential.

7. The method of claim 1, wherein the network traffic analysis output specifies at least one selected from a group consisting of a location of the ED, a location of the EN, a location of the CD, a way of communication used by the ED, a way of communication used by the EN, a way of communication used by the CD, a category of the ED, a category of the EN, a category of the CD, a security status of the ED, a security status of the EN, and a security status of the CD.

8. A method for managing edge devices, the method comprising:
    at a first point-in-time:
        monitoring, over a network, network traffic between an edge device (ED), an edge node (EN), and a cloud device (CD) to obtain a first dataset;
        monitoring, over the network, an activity performed on the ED to obtain a second dataset;
        analyzing the first dataset to generate a network traffic analysis output;
        analyzing the second dataset to generate an activities analysis output;
        performing a first tagging of the ED under an unsecured devices category based on the network traffic analysis output, the activities analysis output, and a first identifier, wherein the first identifier is received from an administrator;
        performing a second tagging, based on the first tagging and a second identifier, of the ED under a corresponding unsecured devices sub-category, wherein the second identifier is received from the administrator;

upon tagging the ED under the corresponding unsecured devices sub-category and based on the activities analysis output, making a determination that the activity is a malicious activity; and implementing, based on the determination, a high-level security policy to disrupt a malicious user of the ED.

9. The method of claim 8, further comprising:

at a second point-in-time, wherein the second point-in-time is after the first point-in-time:

monitoring, over the network, a second network traffic between the ED, the EN, and the CD to obtain a third dataset;

monitoring, over the network, a second activity performed on the ED to obtain a fourth dataset;

analyzing the third dataset to generate a second network traffic analysis output;

analyzing the fourth dataset to generate a second activities analysis output;

performing a third tagging of the ED under the unsecured devices category based on the second network traffic analysis output, the second activities analysis output, and the first identifier;

tagging, based on the third tagging and the second identifier, the ED under a corresponding unsecured devices sub-category;

upon tagging the ED under the corresponding unsecured devices sub-category and based on the second activities analysis output, making a second determination that the activity is a non-malicious activity;

sending, based on the second determination and using a graphical user interface (GUI), a recommendation to the ED to notify a user of the ED that an unsecured state of the ED needs to be managed;

after sending the recommendation, making a third determination that the recommendation has been applied on the ED by the user; and maintaining, based on the third determination, the ED's network access.

10. The method of claim 9, wherein the first identifier indicates that the ED needs to be tagged based on a security status of the ED first.

11. The method of claim 10, wherein the second identifier indicates that after tagging the ED based on the first identifier, the ED needs to be tagged based on a type of an insecurity.

12. The method of claim 8, wherein the activities analysis output specifies that the malicious activity is a data exfiltration event that occurred when the malicious user attempted to transfer a sensitive asset to an unauthorized removable storage media.

13. The method of claim 8, wherein the activities analysis output specifies that the malicious activity is a data loss event that occurred when the malicious user attempted to upload a sensitive asset to an unauthorized file sharing website using an administrator credential.

14. The method of claim 8, wherein the network traffic analysis output specifies at least one selected from a group consisting of a location of the ED, a location of the EN, a location of the CD, a way of communication used by the ED, a way of communication used by the EN, a way of communication used by the CD, a category of the ED, a category of the EN, a category of the CD, a security status of the ED, a security status of the EN, and a security status of the CD.

15. The method of claim 8, wherein the high-level security policy comprises suspending the ED's network access.

16. A method for managing edge devices, the method comprising:

at a first point-in-time:

monitoring, over a network, network traffic between an edge device (ED), an edge node (EN), and a cloud device (CD) to obtain a first dataset;

monitoring, over the network, an activity performed on the ED to obtain a second dataset;

analyzing the first dataset to generate a network traffic analysis output;

analyzing the second dataset to generate an activities analysis output;

performing a first tagging of the ED under a secured devices category based on the network traffic analysis output, the activities analysis output, and a first identifier, wherein the first identifier is received from an administrator;

performing a second tagging, based on the first tagging and a second identifier, of the ED under a corresponding secured devices sub-category, wherein the second identifier is received from the administrator;

upon tagging the ED under the corresponding secured devices sub-category and based on a third identifier, tagging the ED under a second corresponding secured devices sub-category, wherein the third identifier is received from the administrator; and notifying, using a graphical user interface (GUI), the administrator about tagging information of the ED.

17. The method of claim 16, further comprising:

at a second point-in-time, wherein the second point-in-time is after the first point-in-time:

monitoring, over the network, a second network traffic between the ED, the EN, and the CD to obtain a third dataset;

monitoring, over the network, a second activity performed on the ED to obtain a fourth dataset;

analyzing the third dataset to generate a second network traffic analysis output;

analyzing the fourth dataset to generate a second activities analysis output;

performing a third tagging of the ED under an unsecured devices category based on the second network traffic analysis output, the second activities analysis output, and the first identifier;

performing a fourth tagging, based on the third tagging and the second identifier, of the ED under a corresponding unsecured devices sub-category;

upon tagging the ED under the corresponding unsecured devices sub-category and based on the second activities analysis output, making a determination that the activity is a non-malicious activity;

sending, based on the determination and using a graphical user interface (GUI), a recommendation to the ED to notify a user of the ED that an unsecured state of the ED needs to be managed;

after sending the recommendation, making a second determination that the recommendation has been applied on the ED by the user; and maintaining, based on the second determination, the ED's network access.

18. The method of claim 17, wherein the first identifier indicates that the ED needs to be tagged based on a security status of the ED first.

19. The method of claim 18, wherein the second identifier indicates that after tagging the ED based on the first identifier, the ED needs to be tagged based on a type of an insecurity.

20. The method of claim 16, wherein the network traffic analysis output specifies at least one selected from a group consisting of a location of the ED, a location of the EN, a location of the CD, a way of communication used by the ED, a way of communication used by the EN, a way of communication used by the CD, a category of the ED, a category of the EN, a category of the CD, a security status of the ED, a security status of the EN, and a security status of the CD.

* * * * *